US012665641B2

(12) United States Patent
Zhang et al.

(10) Patent No.: US 12,665,641 B2
(45) Date of Patent: Jun. 23, 2026

(54) CHANNEL STATE INFORMATION FEEDBACK METHOD AND APPARATUS, DEVICE, AND STORAGE MEDIUM

(71) Applicant: ZTE CORPORATION, Shenzhen (CN)

(72) Inventors: Chenchen Zhang, Shenzhen (CN); Xing Liu, Shenzhen (CN); Peng Hao, Shenzhen (CN); Xingguang Wei, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 532 days.

(21) Appl. No.: 18/040,891

(22) PCT Filed: Aug. 5, 2021

(86) PCT No.: PCT/CN2021/110994
§ 371 (c)(1),
(2) Date: Feb. 7, 2023

(87) PCT Pub. No.: WO2022/028549
PCT Pub. Date: Feb. 10, 2022

(65) Prior Publication Data
US 2023/0308153 A1     Sep. 28, 2023

(30) Foreign Application Priority Data
Aug. 7, 2020    (CN) .......................... 202010791675.8

(51) Int. Cl.
*H04B 7/06*          (2006.01)
*H04B 17/309*     (2015.01)
*H04W 24/08*      (2009.01)

(52) U.S. Cl.
CPC ......... *H04B 7/0626* (2013.01); *H04B 17/309* (2015.01); *H04W 24/08* (2013.01)

(58) Field of Classification Search
CPC .... H04B 7/024; H04B 7/0626; H04B 7/0632; H04B 17/309; H04W 16/28; H04W 24/08; H04W 24/10
See application file for complete search history.

(56) References Cited

U.S. PATENT DOCUMENTS

2012/0163208 A1*   6/2012  Kamble .............. H04L 41/5032
                                                                    370/252
2013/0182594 A1*   7/2013  Kim ...................... H04L 5/0037
                                                                    370/252
(Continued)

FOREIGN PATENT DOCUMENTS

CN          104285396 A       1/2015
CN          108111199 A       6/2018
(Continued)

OTHER PUBLICATIONS

Japanese Office Action of Application No. 2023-508610, dated Jan. 30, 2024, 10 pages including translation.
(Continued)

*Primary Examiner* — Michael Thier
*Assistant Examiner* — Prince A Mensah
(74) *Attorney, Agent, or Firm* — Morgan, Lewis & Bockius LLP

(57) ABSTRACT

Provided are a channel state information (CSI) feedback method and apparatus, a device, and a storage medium. The method includes: measuring channel state information; and sending CSI feedback corresponding to a channel state information parameter set.

16 Claims, 7 Drawing Sheets

(56) References Cited

U.S. PATENT DOCUMENTS

| | | | | |
|---|---|---|---|---|
| 2013/0301448 | A1 | 11/2013 | Sayana et al. | |
| 2015/0381310 | A1* | 12/2015 | Hammarwall | H04L 1/0003 |
| | | | | 370/329 |
| 2016/0013852 | A1* | 1/2016 | Lee | H04L 5/0053 |
| | | | | 370/252 |
| 2018/0152858 | A1 | 5/2018 | Chen | |
| 2019/0097874 | A1* | 3/2019 | Zhou | H04W 16/28 |
| 2020/0358502 | A1* | 11/2020 | Faxér | H04W 24/10 |
| 2023/0087003 | A1* | 3/2023 | Hao | H04B 7/0632 |
| | | | | 370/329 |
| 2024/0097762 | A1* | 3/2024 | Kyung | H04B 7/024 |

FOREIGN PATENT DOCUMENTS

| | | | |
|---|---|---|---|
| CN | 108631846 | A | 10/2018 |
| CN | 110249574 | A | 9/2019 |
| CN | 110474661 | A | 11/2019 |
| CN | 112350788 | A | 2/2021 |
| EP | 2773159 | A1 | 9/2014 |
| JP | 2020509655 | A | 3/2020 |
| WO | WO 2013/168116 | A2 | 11/2013 |
| WO | WO-2018030327 | A1 | 2/2018 |
| WO | WO 2018/171562 | A1 | 9/2018 |

OTHER PUBLICATIONS

LG Electronics, "CSI feedback for OL and semi-OL MIMO", 3GPP TSG RAN WG1 Meeting #90, R1-1713146, Aug. 21, 2017.

Zte, "Discussion on mechanisms to Improve Reliability for RRC_CONNECTED UEs", 3GPP TSG RAN WG1 #104-e, R1-2100107, Jan. 25, 2021.

LG Electronics, "CSI feedback for OL and semi-OL MIMO", 3GPP TSG-RAN WG1 Meeting #90, R1-1713146, Aug. 25, 2017, Prague, Czechia, 2 pages.

International Search Report in Application No. PCT/CN2021/110994 dated Oct. 26, 2021, 4 pages, including translation.

Office Action in Indian Application No. 202327015212, dated Sep. 11, 2023, 5 pages.

First Search Report in Chinese Application No. 2020107916758, dated Sep. 2, 2024, 7 pages, including translation.

First Office Action in Chinese Application No. 202010791675.8, dated Sep. 3, 2024, 23 pages, including translation.

Extended European Search Report in Application No. 21852155.7 dated Sep. 4, 2024, 11 pages.

Kaikkonen et al., "Main Radio Interface Related System Procedures", Apr. 24, 2020, pp. 1-136, XP055845846, Retrieved from the Internet: URL:https://onlinelibrary.wiley.com/doi/pd fdirect/10.1002/9781119582335.ch4.

Anonymous, "3rd Generation Partnership Project; Technical Specification Group Radio Access Network; NR; Physical layer procedures for data (Release 16)", 3GPP TS 38.214 V16.0.0, vol. 0, Dec. 1, 2019, XP055856918.

Oppo, "Remaining Issues and Text Proposals for Beam Management", 3GPP Draft; RI-1806840, 3rd Generation Partnership Project (3GPP), Mobile Competence Centre ; 650, Route Des Lucioles ; F-06921 Sophia-Antipolis Cedex; France, vol. RAN WG1, No. 93, Busan, Korea; May 21, 2018-May 25, 2018, May 20, 2018, XP051442040. Retrieved from the Internet: URL:http://www.3gpp.org/ftp/Meetings%5F3GP P%5FSYNC/RAN1/Docs/.

* cited by examiner

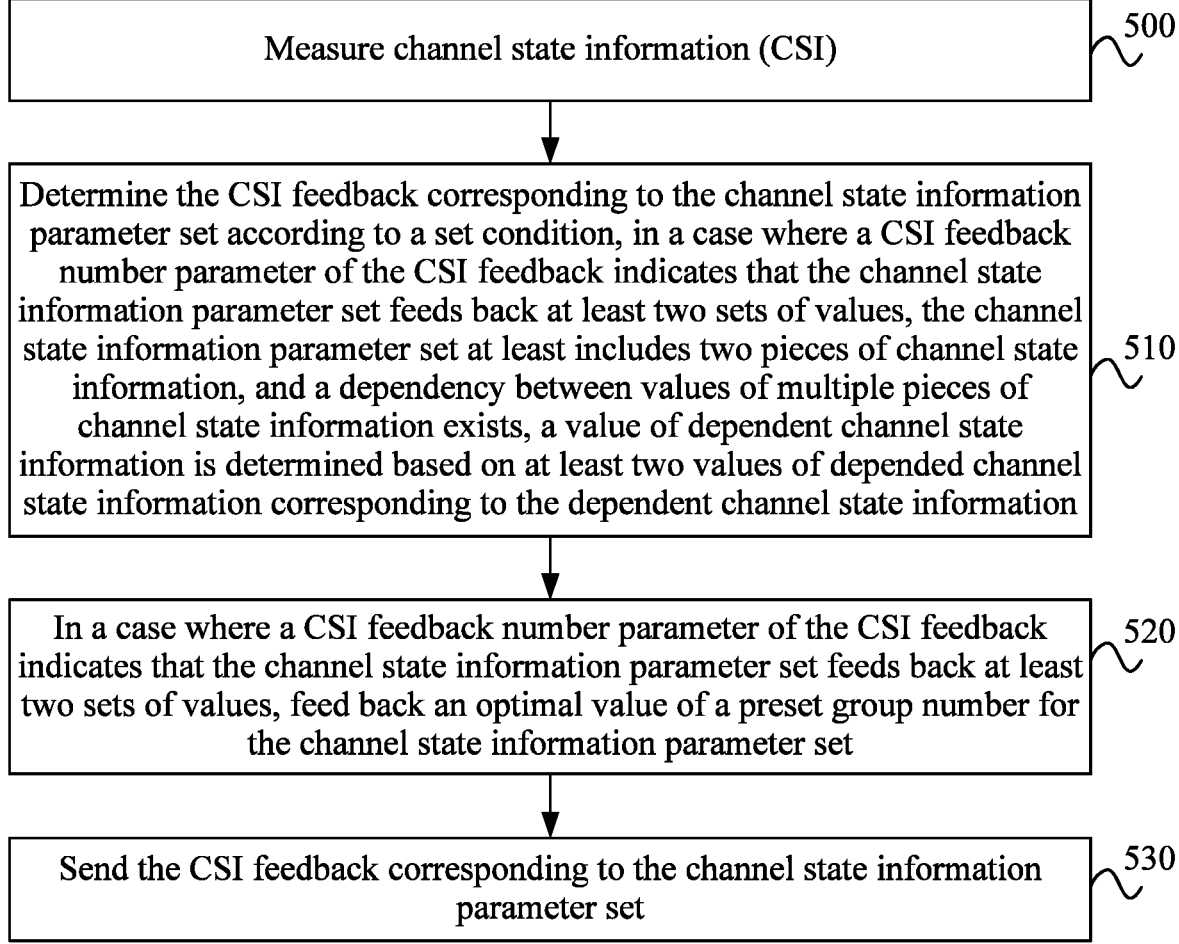

Measure channel state information (CSI) — 500

Determine the CSI feedback corresponding to the channel state information parameter set according to a set condition, in a case where a CSI feedback number parameter of the CSI feedback indicates that the channel state information parameter set feeds back at least two sets of values, the channel state information parameter set at least includes two pieces of channel state information, and a dependency between values of multiple pieces of channel state information exists, a value of dependent channel state information is determined based on at least two values of depended channel state information corresponding to the dependent channel state information — 510

In a case where a CSI feedback number parameter of the CSI feedback indicates that the channel state information parameter set feeds back at least two sets of values, feed back an optimal value of a preset group number for the channel state information parameter set — 520

Send the CSI feedback corresponding to the channel state information parameter set — 530

FIG. 5

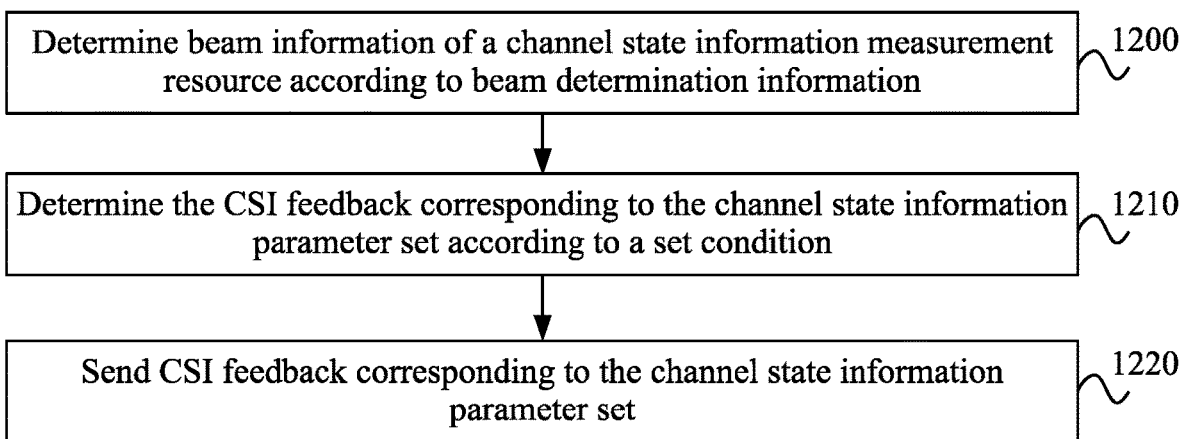

Determine beam information of a channel state information measurement resource according to beam determination information ~1200

Determine the CSI feedback corresponding to the channel state information parameter set according to a set condition ~1210

Send CSI feedback corresponding to the channel state information parameter set ~1220

FIG. 12

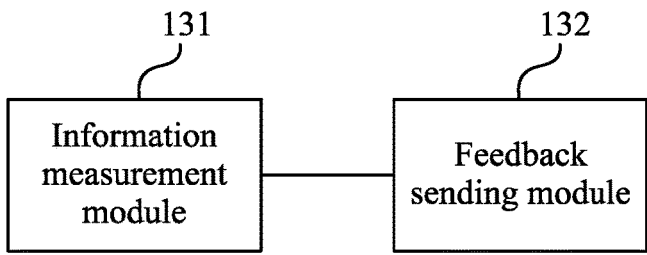

131

132

Information measurement module

Feedback sending module

FIG. 13

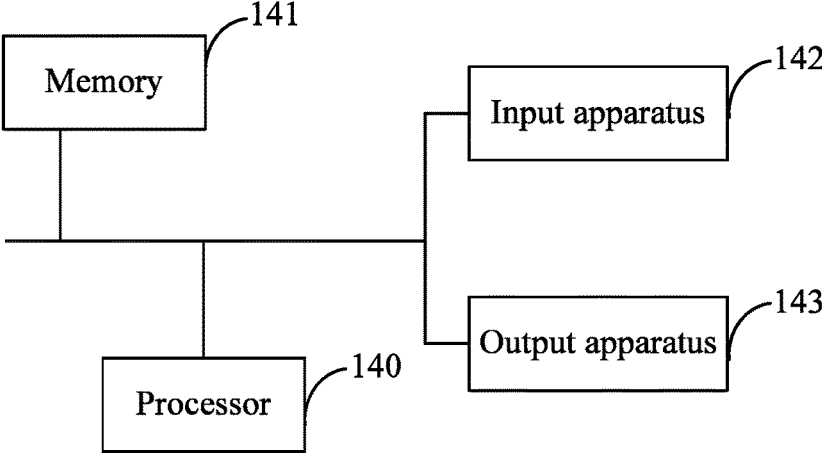

141

Memory

142

Input apparatus

143

Output apparatus

140

Processor

FIG. 14

CHANNEL STATE INFORMATION FEEDBACK METHOD AND APPARATUS, DEVICE, AND STORAGE MEDIUM

CROSS REFERENCE TO RELATED APPLICATIONS

This is a National Stage Application filed under 35 U.S.C. 371, based on International Patent Application No. PCT/CN2021/110994, filed on Aug. 5, 2021, which claims priority to Chinese Patent Application No. 202010791675.8 filed with the China National Intellectual Property Administration (CNIPA) on Aug. 7, 2020, the disclosures of which are incorporated herein by reference in their entireties.

TECHNICAL FIELD

The present application relates to the technical field of communications, and for example, a channel state information feedback method and apparatus, a device, and a storage medium.

BACKGROUND

In the communication field, for broadcast and multicast service, a base station often needs to send a physical downlink shared channel (PDSCH) to a group of users. In order to ensure the reliability of transmission, the base station needs to make reference to a channel state information (CSI) feedback of a group of users, so as to obtain a link adaptation effect suitable for the group of users.

In this case, the base station needs to determine, according to channel state information fed back by each user, several transmission attributes for a group of users, such as a modulation and coding scheme (MCS), precoding information, layer information, port information. If each user still operates according to a channel state information measurement mechanism and a feedback mechanism in a unicast transmission mode, channel state information fed back to the base station by a terminal may be less and insufficient to support the base station to perform a scheduling based on feedback of a group of users. In order to adapt to multicast and broadcast services, it is necessary to enhance the channel state information measurement mechanism and the feedback mechanism of users, so that a group of users can feed back richer information to the base station, and thus the accuracy of scheduling decisions made by the base station based on a group of users is improved.

SUMMARY

Embodiments of the present application provide a channel state information feedback method and apparatus, a device, and a storage medium, so as to enable feedback of channel state information, enrich feedback content, enhance measurement of the channel state information, and improve the accuracy of scheduling decisions made by a base station.

An embodiment of the present application provides a channel state information feedback method, the method includes: measuring channel state information (CSI); and sending CSI feedback corresponding to a channel state information parameter set.

An embodiment of the present application further provides a channel state information feedback apparatus, the apparatus includes an information measurement module and a feedback sending module. The information measurement module is configured to measure channel state information (CSI). The feedback sending module is configured to send CSI feedback corresponding to a channel state information parameter set.

An embodiment of the present application further provides a device, and the device includes one or more processors and a memory. The memory is configured to store one or more programs. The one or more programs, when executed by the one or more processors, cause the one or more processors to implement the channel state information feedback method described in any one of the embodiments of the present application.

An embodiment of the present application further provides a computer-readable storage medium. The computer-readable storage medium stores a computer program, where the computer program, when executed by a processor, implements the channel state information feedback method described in any one of the embodiments of the present application.

According to the embodiments of the present application, the channel state information is measured at a terminal according to the channel state information parameter set, then the acquired channel state information is fed back to the base station, so that the feedback of the channel state information is achieved, the feedback content is enriched through the channel state information parameter set, the measurement of the channel state information is enhanced, and thus the accuracy of scheduling decision made by the base station is improved.

BRIEF DESCRIPTION OF DRAWINGS

FIG. 5 is a flowchart of another channel state information feedback method according to an embodiment of the present application;

FIG. 12 is a flowchart of another channel state information feedback method according to an embodiment of the present application;

FIG. 13 is a schematic structural diagram of a channel state information feedback apparatus according to an embodiment of the present application; and FIG. 14 is a schematic structural diagram of a device according to an embodiment of the present application.

DETAILED DESCRIPTION

Figure 1:
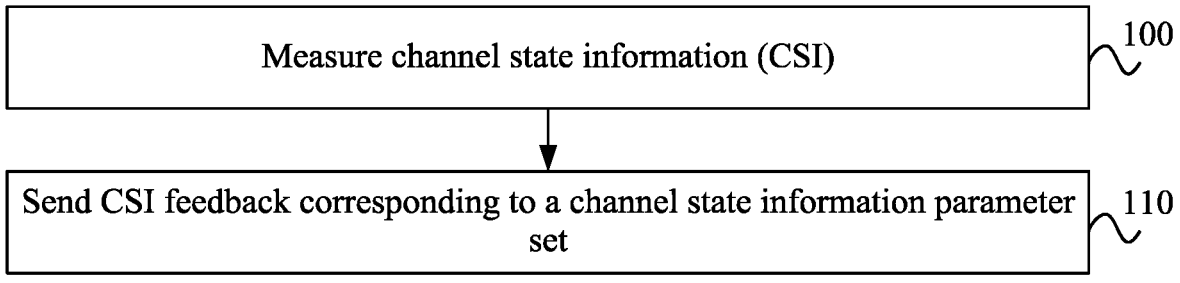
FIG. 1 is a flowchart of a channel state information feedback method according to an embodiment of the present application.

Hereinafter, embodiments of the present application will be described in detail in conjunction with the accompanying drawings.

For new radio (NR) systems in the related art, three types of CSI feedback are supported, i.e., aperiodic CSI feedback, periodic CSI feedback, and semi-persistent CSI feedback. For the aperiodic CSI feedback, it is triggered by PDCCH scheduling uplink data, both the triggered aperiodic CSI feedback and the uplink data are carried in an uplink physical uplink shared channel (PUSCH), therefore it may be considered that time-frequency resources transmitting the aperiodic CSI feedback are indicated by a time domain resource allocation (TDRA) domain and a frequency domain resource allocation (FDRA) domain in DCI scheduling uplink data. For the periodic CSI feedback, a terminal feeds back in PUCCH, and a base station semi-statically configures PUCCH resources for the periodic CSI feedback through radio resource control (RRC) signaling. For the semi-persistent CSI feedback, there are two bearer manners: one bearer manner is semi-persistent CSI feedback activated and deactivated by a medium access control-control element (MAC CE), which is carried on the PUCCH; the other bearer manner is activated and deactivated by the PDCCH, and is carried on the PUSCH scheduled by this PDCCH. A bearer source of the former manner is similar to the periodic CSI feedback, and is carried on PUCCH resources semi-statically configured by the base station. A bearer source of the latter manner is similar to the aperiodic CSI feedback, and is carried on PUSCH resources indicated by a TDRA domain and an FDRA domain of PDCCH.

If CSI information fed back by the terminal is absent, then the base station may only perform the link adaptation in a more conservative manner.

According to the NR protocol, the base station may configure a number of sub-signaling related to a channel state information report (CSI Report) in RRC signaling channel state information-report configuration (CSI-Report-Config), and configure a reference signal (RS) resource configuration for measurement, the RS resource configuration may contain 1 or more RS resource configuration sets. a) For an A-CSI feedback that needs to be triggered by DCI sent by the base station, a CSI feedback domain of the DCI may indicate a trigger state, the trigger state associates with one or more pieces of channel state information-associated report configuration information (CSI-AssociatedReport-ConfigInfo), each CSI-AssociatedReportConfigInfo indicates that the associated CSI Report measures based on which RS resource configuration set in the RS resource configuration, and indicates beam information used by each RS resource in the RS resource configuration set. b) For semi-persistent-channel state information (SP-CSI) carried on PUCCH and needing to be activated/deactivated with MAC CE sent by the base station, the RS resource configuration for measurement configured in the CSI-ReportConfig may only include 1 RS resource configuration set. c) For the SP-CSI carried on the PUSCH and needing to be triggered by DCI sent by the base station, a CSI Request domain of the DCI may indicate one trigger state, the trigger state is one CSI-ReportConfig. d) For a periodic-channel state information (P-CSI) feedback, the base station does not need to send a trigger indication, and the UE performs the P-CSI feedback as scheduled according to the periodicity configured in the relevant CSI-ReportConfig and a feedback resource.

According to the NR protocol, a feedback format corresponding to the CSI Report may be configured by a sub-signaling report quantity of the RRC signaling CSI-ReportConfig, which specifically includes the following feedback formats: None, cri-RI-PMI-CQI, cri-RI-LI-PMI-CQI, cri-RI-i1, cri-RI-i1-CQI, cri-RI-CQI, cri-RSRP and ssb-Index-RSRP. The feedback format specifies which channel state information should be included in a corresponding CSI Report. How the terminal feeds back information to the base station that is more suitable for the multicast broadcast transmission adaptive link.

FIG. 1 is a flowchart of a channel state information feedback method according to an embodiment of the present application, the embodiment of the present application are applicable to a case that a terminal feeds back channel state information in a multicast broadcast transmission, the method may be performed by a channel state information feedback apparatus in the embodiment of the present application, the apparatus may be implemented by means of software and/or hardware, the apparatus is typically integrated in the terminal, the method provided in the embodiment of the present application specifically includes the following.

In 100, channel state information (CSI) is measured.

Specifically, the terminal may acquire the channel state information (CSI) through measurement. It will be appreciated that the channel state information (CSI) at least includes one type of state information of a channel, and one or more values fed back for each type of state information in the channel state information may be provided.

In 110, CSI feedback corresponding to a channel state information parameter set is sent.

The channel state information parameter set may be used for indicating a set of channel state information that needs to be fed back by the terminal, a type of feedback information, and the channel state information parameter set may include one or more pieces of channel state information, such as a channel-quality indicator (CQI), a precoding matrix indicator (PMI), and a rank indicator (RI).

Specifically, after the terminal completes a channel measurement corresponding to the channel state information parameter set, the acquired channel state information (CSI) may be fed back to the base station, so that the base station may make a scheduling strategy for a group of users according to the fed-back CSI.

According to the embodiments of the present application, the terminal measures the channel state information, then the acquired channel state information is fed back to the base station, so that the feedback of the channel state information is achieved, the feedback content is enriched through the channel state information parameter set, the measurement of the channel state information is enhanced, and the accuracy of scheduling decisions made by the base station under the broadcast multicast service is improved.

Figure 2:
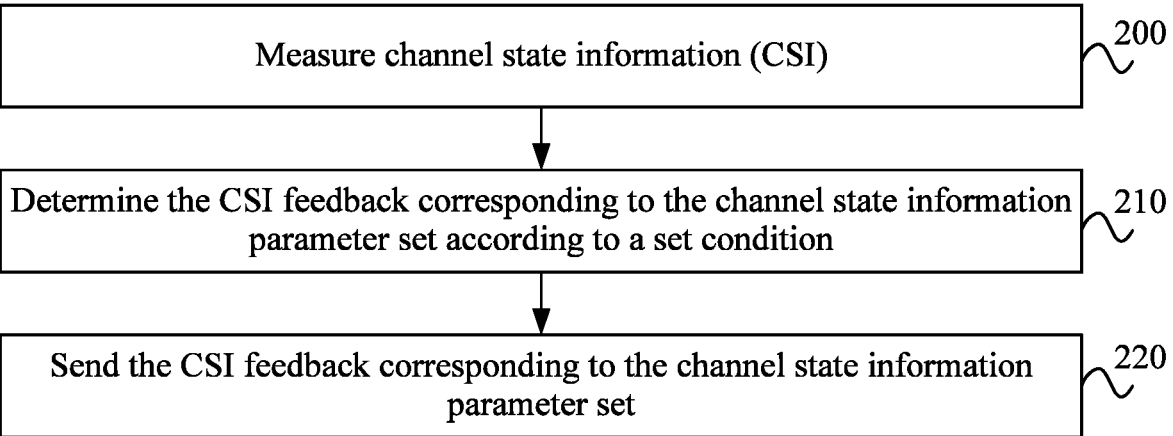
FIG. 2 is a flowchart of another channel state information feedback method according to an embodiment of the present application.

FIG. 2 is a flowchart of another channel state information feedback method according to an embodiment of the present application, the embodiment of the present application is embodied on the basis of the above-described embodiments, and referring to FIG. 2, the method provided in the embodiment of the present application specifically includes the following.

In 200, channel state information (CSI) is measured.

In 210, the CSI feedback corresponding to the channel state information parameter set is determined according to a set condition.

In the embodiments of the present application, the set condition may be detected at the terminal, a number of values fed back for the channel state information parameter set may be determined according to different detected conditions, for example, when the base station instructs a CSI feedback number parameter to the terminal, the terminal may extract a value in the CSI feedback number parameter as a feedback quantity corresponding to the channel state information parameter set required to be fed back in the CSI feedback.

In 220, the CSI feedback corresponding to the channel state information parameter set is sent.

Further, on the basis of the above-described embodiments of the present application, the set condition at least includes one of: a configuration of a CSI feedback number parameter; a parameter value of a CSI feedback number parameter; reception of a scrambling configuration of an association downlink control information (DCI); a scheduling data type identifier in association DCI; reception of a format of association DCI; reception of a time-frequency domain resource of association DCI; reception of at least two CSI feedback configurations having a same content and different indices; or reception of at least two CSI feedback configurations having a same preset content, where the preset content includes at least one content of the at least two CSI feedback configurations.

The configuration of the feedback number parameter may be a configuration that the feedback quantity corresponding to the channel state information parameter set is determined by means of whether the feedback number parameter is configured. The feedback number parameter corresponds to the feedback quantity of the channel state information parameter set. The reception of the scrambling configuration of the association downlink control information (DCI) may be a scrambling configuration that the base station sends the DCI to the terminal, and since a scrambling manner may include a cell-radio network temporary identifier (C-RNTI), a configured scheduling RNTI (CS-RNTI), or a modulation and coding scheme-Cell-RNTI (MCS-C-RNTI), different scrambling configurations may be used to represent a number of values corresponding to the channel state information parameter set. The scheduling data type identifier in the association DCI may be a scheduling data type identifier in the DCI received by the terminal, for example, a feedback quantity of a channel state information parameter set corresponding to a unicast data type may be different from a feedback quantity of a channel state information parameter set corresponding to a multicast data type. The reception of the format of the association DCI may be a data format of the DCI received by the terminal. The reception of the time-frequency domain resource of the association DCI may be a time domain resource or a frequency domain resource occupied by the DCI and received by the terminal, and different time-frequency domain resources may correspond to different channel state information parameter sets. The reception of the CSI feedback configuration may be two CSI configurations having the same content but different indices or multiple CSI feedback configurations having the same preset content, the preset content may be one or more of the common contents in the CSI feedback configuration, and when a current terminal determines that the above cases occurs, the feedback quantity of the channel state information parameter set may be determined to be a specific quantity.

Figure 3:
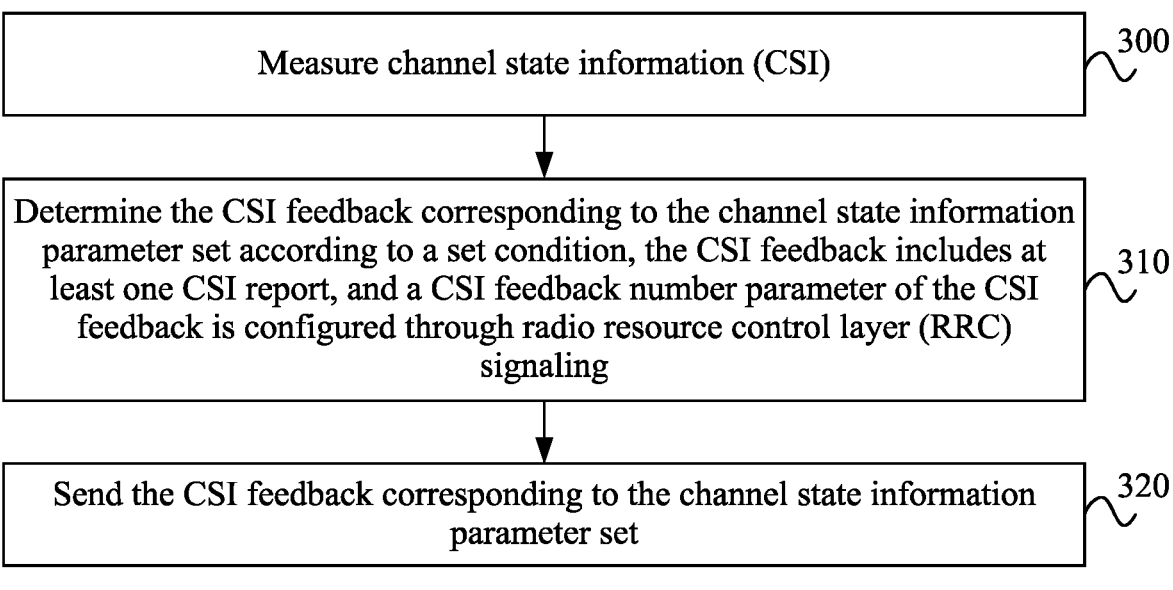
FIG. 3 is a flowchart of another channel state information feedback method according to an embodiment of the present application.

FIG. 3 is a flowchart of another channel state information feedback method according to an embodiment of the present application, the embodiment of the present application is embodied on the basis of the above-described embodiments, and referring to FIG. 3, the method provided in the embodiment of the present application specifically includes the following.

In 300, channel state information (CSI) is measured.

In 310, the CSI feedback corresponding to the channel state information parameter set is determined according to a set condition, the CSI feedback includes at least one CSI report, and a CSI feedback number parameter of the CSI feedback is configured through radio resource control layer (RRC) signaling.

In the embodiments of the present application, one or more CSI reports may be included in the CSI feedback, the CSI report may be used to feed back the channel state information, a value fed back for the channel state information parameter set and included in the CSI reports may be determined by the CSI feedback number parameter, and the CSI feedback number parameter may be configured by RRC signaling.

Further, on the basis of the above-described embodiments of the present application, the CSI feedback number parameter of the CSI feedback is configured for a specific CSI report, or the CSI feedback number parameter is configured for all CSI reports.

Specifically, one or more CSI reports may be included in the CSI feedback, a number of fed-back channel state information may be set by the CSI feedback number parameter, and a number for the channel state information parameter set that may be set by the CSI feedback parameter number may be set for a certain one or several specific CSI reports in the CSI feedback or may be set for all CSI reports in the CSI feedback.

In 320, the CSI feedback corresponding to the channel state information parameter set is sent.

Figure 4:
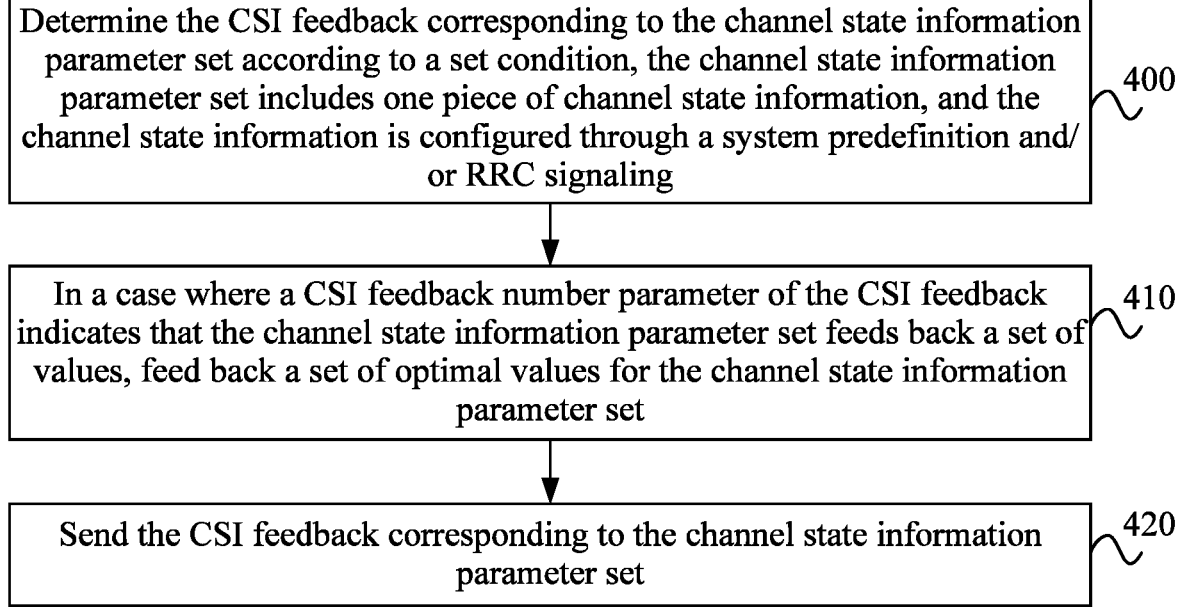
FIG. 4 is a flowchart of another channel state information feedback method according to an embodiment of the present application.

FIG. 4 is a flowchart of another channel state information feedback method according to an embodiment of the present application, the embodiment of the present application is embodied on the basis of the above-described embodiments of the present application, the channel state information parameter set includes one piece of channel state information, and referring to FIG. 4, the method provided in the embodiment of the present application specifically includes the following.

In 400, the CSI feedback corresponding to the channel state information parameter set is determined according to a set condition, the channel state information parameter set includes one piece of channel state information, and the channel state information is configured through a system predefinition and/or RRC signaling.

In an exemplary embodiment, the channel state information parameter set includes one piece of channel state information, and the terminal may determine a feedback quantity of this channel state information in conjunction with the set condition. Further, one piece of channel state information included in the channel state information parameter set may be configured through a system predefinition and/or RRC signaling.

In 410, in a case where a CSI feedback number parameter of the CSI feedback indicates that the channel state information parameter set feeds back a set of values, a set of optimal values are fed back for the channel state information parameter set.

Specifically, when a value quantity of the channel state information set configured in the CSI feedback number parameter is 1, the CSI feedback includes a set of values of the channel state information, a set of optimal values may be selected from multiple sets of values determined during a CSI measurement, and the set of optimal values are used as values for the CSI feedback corresponding to the channel state information parameter set, the optimal value may refer to that a value of the channel state information reflects an optimal channel quality or an optimal channel throughput, and the optimal value may specifically include one or more of an optimal modulation order that may be achieved under a condition of a certain error rate, an optimal coding code rate that may be achieved under the condition of the certain error rate, and an optimal transport block size that may be achieved under the condition of the certain error rate.

In 420, the CSI feedback corresponding to the channel state information parameter set is sent.

Further, on the basis of the above-described embodiments of the present application, association DCI of the CSI feedback includes DCI triggering the CSI feedback or DCI scheduling a data transmission.

FIG. 5 is a flowchart of another channel state information feedback method according to an embodiment of the present application, the embodiment of the present application is embodied on the basis of the above-described embodiments of the present application, the channel state information parameter set includes multiple pieces of channel state information, and referring to FIG. 5, the method provided in the embodiment of the present application specifically includes the following.

In 500, channel state information (CSI) is measured.

In 510, the CSI feedback corresponding to the channel state information parameter set is determined according to a set condition, in a case where a CSI feedback number parameter of the CSI feedback indicates that the channel state information parameter set feeds back at least two sets of values, the channel state information parameter set at least includes two pieces of channel state information, and a dependency between values of multiple pieces of channel state information exists, a value of dependent channel state information is determined based on at least two values of depended channel state information corresponding to the dependent channel state information.

In an exemplary embodiment, the channel state information parameter set includes multiple pieces of channel state information, and at least two sets of values fed back for the channel state information parameter set are determined. When a dependency between the multiple pieces of channel state information included in the channel state information parameter set exists, the value of the dependent channel state information needs to be determined by multiple values of the depended channel state information corresponding to the dependent channel state information. For example, a value of a channel state information parameter 1 needs to be determined by a value of a channel state information parameter 2, then the terminal has to feed back several different values for the channel state information parameter 2, the value of the channel state information parameter 1 is obtained at a value of each channel state information parameter 2, and thus the terminal obtains multiple sets of values of {the channel state information parameter 1, the channel state information parameter 2}.

In 520, in a case where a CSI feedback number parameter of the CSI feedback indicates that the channel state information parameter set feeds back at least two sets of values, an optimal value of a preset group number is fed back for the channel state information parameter set, where the preset group number is a positive integer greater than 1, and the preset group number is predefined by a system or configured through the CSI feedback number parameter.

In the embodiments of the present application, when the CSI feedback number parameter indicates that the CSI feeds back multiple sets of values, the channel state information acquired by sounding may be sorted, optimal multiple sets of values of the channel state information may be selected for feedback, where the fed-back group number may be predefined by the system or configured through the CSI feedback number parameter. The optimal value may refer to that a value of the channel state information reflects an optimal channel quality or an optimal channel throughput, and the optimal value may specifically be a modulation order under a condition of a preset error rate, a coding code rate under the condition of the preset error rate, and a transport block size under the condition of the preset error rate.

In 530, the CSI feedback corresponding to the channel state information parameter set is sent.

Further, on the basis of the above-described embodiments of the present application, the optimal value includes at least one of: a modulation order under a condition of a preset error rate, a coding code rate under the condition of the preset error rate, or a transport block size under the condition of the preset error rate.

Figure 6:
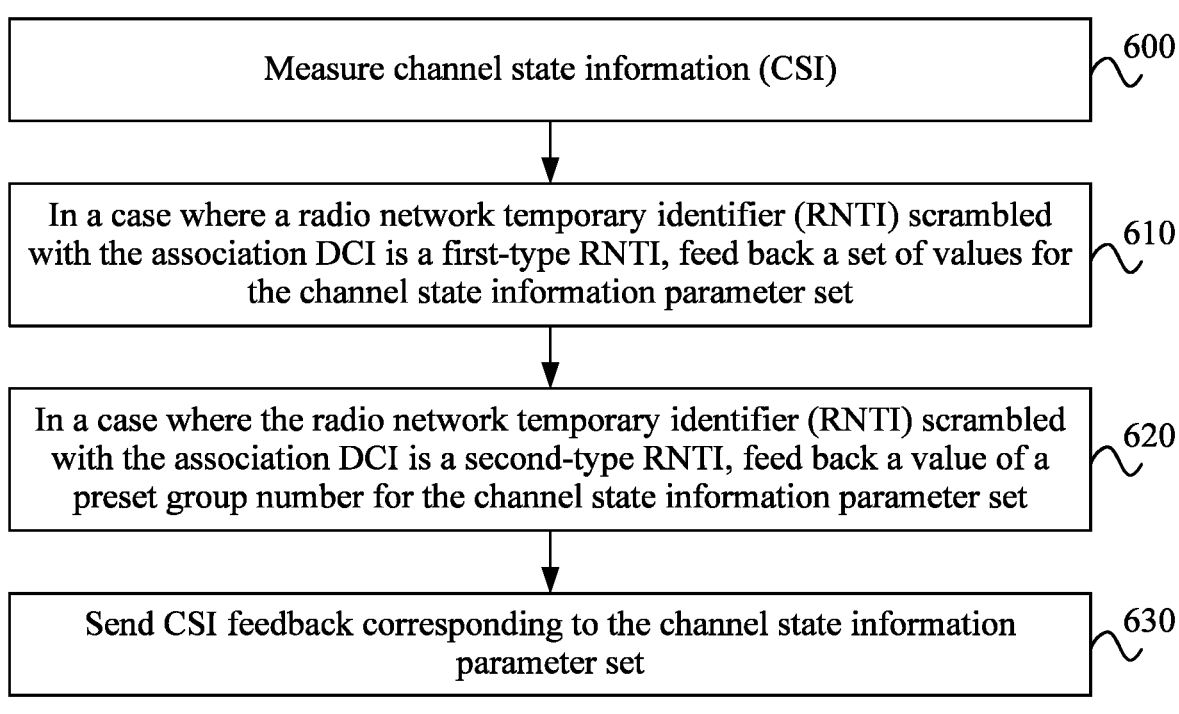
FIG. 6 is a flowchart of a channel state information feedback method according to an embodiment of the present application.

FIG. 6 is a flowchart of a channel state information feedback method according to an embodiment of the present application, the embodiment of the present application is embodied on the basis of the above-described embodiments of the present application, and referring to FIG. 6, the method provided in the embodiments of the present application specifically includes the following.

In 600, channel state information (CSI) is measured.

In 610, in a case where a radio network temporary identifier (RNTI) scrambled with the association DCI is a first-type RNTI, a set of values are fed back for the channel state information parameter set.

In an exemplary embodiment, the terminal may determine a type of the received radio network temporary identifier (RNTI) scrambled with the association DCI, when the RNTI of the DCI is the first-type RNTI, the set of values may be fed back for the channel state information parameter set.

In process 620, in a case where the radio network temporary identifier (RNTI) scrambled with the association DCI is a second-type RNTI, a value of a preset group number is fed back for the channel state information parameter set.

Specifically, the terminal may determine a type of the received RNTI scrambled with the association DCI, when the RNTI of the DCI is the second-type RNTI, the value of the preset group number is fed back for the channel state information parameter set, where the preset group number is predefined by a system or configured through the CSI feedback number parameter.

In 630, CSI feedback corresponding to the channel state information parameter set is sent.

Further, on the basis of the above-described embodiments of the present application, the first-type RNTI at least includes one of a C-RNTI, a CS-RNTI or an MCS-C-RNTI, and the second-type RNTI includes a non-terminal-specific RNTI.

In the embodiments of the present application, the first-type RNTI may be a special type of RNTI and may include one or more of the C-RNTI, the CS-RNTI and the MCS-C-RNTI, and the second-type RNTI may be a non-terminal-specific RNTI, such as an RNTI for a group of terminals or for all terminals.

Figure 7:
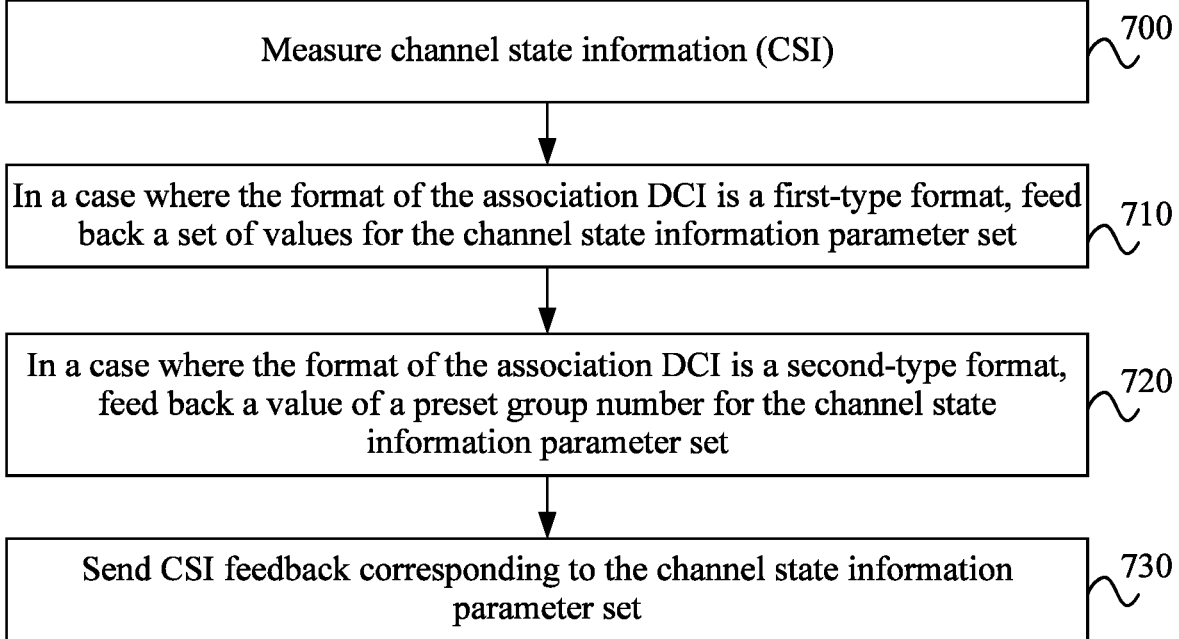
FIG. 7 is a flowchart of another channel state information feedback method according to an embodiment of the present application.

FIG. 7 is a flowchart of another channel state information feedback method according to an embodiment of the present application, the embodiment of the present application is embodied on the basis of the above-described embodiments of the present application, and referring to FIG. 7, the method provided in the embodiments of the present application specifically includes the following.

In 700, channel state information (CSI) is measured.

In 710, in a case where the format of the association DCI is a first-type format, a set of values are fed back for the channel state information parameter set.

In 720, in a case where the format of the association DCI is a second-type format, a value of a preset group number is fed back for the channel state information parameter set, where the preset group number is a positive integer greater than 1, and the preset group number is predefined by a system or configured through the CSI feedback number parameter, where the first-type format and the second-type format include different number of bits.

In an exemplary embodiment, the terminal may determine the format of the association DCI, for example, the terminal may determine a number of bits included in the association DCI, whether the format of the association DCI being the first-type format or the second-type format is determined by the number of bits, when the format of the association DCI is the first-type format, the CSI feeds back the set of values for the channel state information parameter set; when the format of the association DCI is the second-type format, the CSI feeds back the value of the preset group number for the channel state information parameter set, and the preset group number is predefined by the system or configured through the CSI feedback number parameter.

In 730, CSI feedback corresponding to the channel state information parameter set is sent.

Figure 8:
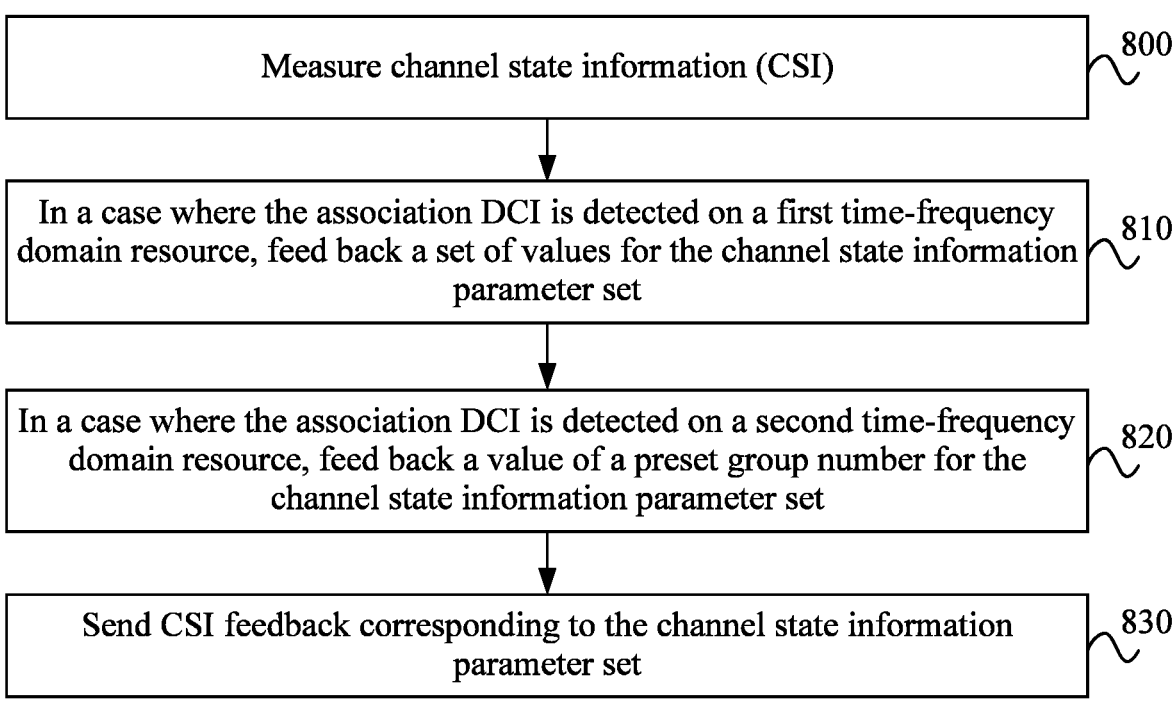
FIG. 8 is a flowchart of another channel state information feedback method according to an embodiment of the present application.

FIG. 8 is a flowchart of another channel state information feedback method according to an embodiment of the present application, the embodiment of the present application is embodied on the basis of the above-described embodiments of the present application, and referring to FIG. 8, the method provided in the embodiments of the present application specifically includes the following.

In 800, channel state information (CSI) is measured.

In 810, in a case where the association DCI is detected on a first time-frequency domain resource, a set of values are fed back for the channel state information parameter set.

In 820, in a case where the association DCI is detected on a second time-frequency domain resource, a value of a preset group number is fed back for the channel state information parameter set, where the preset group number is a positive integer greater than 1, and the preset group number is predefined by a system or configured through the CSI feedback number parameter; where the first time-frequency domain resource and the second time-frequency domain resource are set based on different pieces of configuration information.

In an exemplary embodiment, the terminal may determine the time-frequency domain resource of the association DCI, for example, the terminal may determine a kind of configuration information of the time-frequency domain resource of the association DCI, for example, the configuration information may include a control resource set (CORESET), a search space, an aggregation level, a blind detection opportunity, and a resource element group (REG). A format of the association DCI is determined to be a first time-frequency domain resource and a second time-frequency domain resource through the configuration information of the time-frequency domain resource, when the format of the association DCI is determined to be the first time-frequency domain resource, the CSI feeds back the set of values for the channel state information parameter set, when the format of the association DCI is determined to be the second time-frequency domain resource, the CSI feeds back the value of the preset group number for the channel state information parameter set, and the preset group number is predefined by a system or configured through the CSI feedback number parameter.

In 830, CSI feedback corresponding to the channel state information parameter set is sent.

Further, on the basis of the above-described embodiments of the present application, the configuration information at least includes one of: the control resource set (CORESET), the search space, the aggregation level, the blind detection opportunity, or the resource element group (REG).

Figure 9:
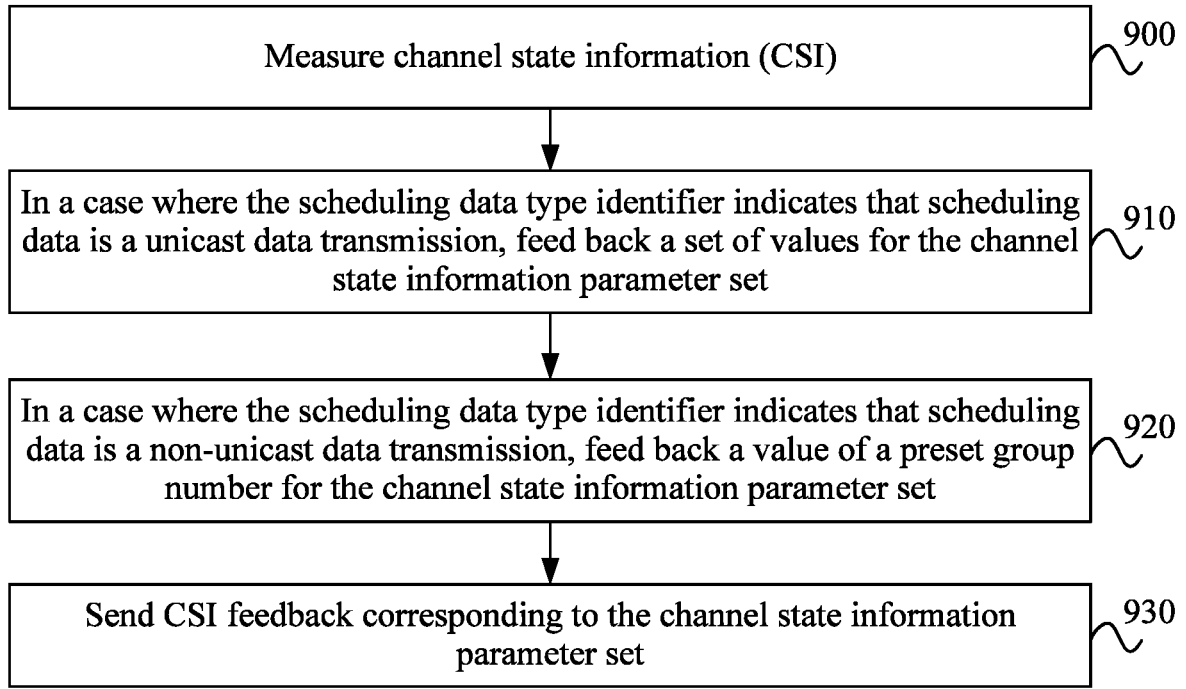
FIG. 9 is a flowchart of another channel state information feedback method according to an embodiment of the present application.

FIG. 9 is a flowchart of another channel state information feedback method according to an embodiment of the present application, the embodiment of the present application is embodied on the basis of the above-described embodiments of the present application, and referring to FIG. 9, the method provided in the embodiments of the present application specifically includes the following.

In 900, channel state information (CSI) is measured.

In 910, in a case where the scheduling data type identifier indicates that scheduling data is a unicast data transmission, a set of values are fed back for the channel state information parameter set.

In 920, in a case where the scheduling data type identifier indicates that scheduling data is a non-unicast data transmission, a value of a preset group number is fed back for the channel state information parameter set, where the preset group number is a positive integer greater than 1, and the preset group number is predefined by a system or configured through the CSI feedback number parameter.

In an exemplary embodiment, the terminal may determine the indicated scheduling data type identifier of the association DCI, if the scheduling data type identifier is the unicast data transmission, the DCI feeds back the set of values corresponding to the channel state information parameter set, if the scheduling data type identifier is the non-unicast data transmission such as multicast or broadcast, the DCI feeds back the value of the preset group number corresponding to the channel state information parameter set, and the preset group number is predefined by a system or configured through the CSI feedback number parameter.

In 930, CSI feedback corresponding to the channel state information parameter set is sent.

Further, on the basis of the above-described embodiments of the present application, the scheduling data type identifier at least includes one of: a carrier indication, a bandwidth part (BWP) indication, a time domain resource allocation indication, a frequency domain resource allocation indication, a demodulation reference signal (DMRS) sequence related information indication, a scrambling code information indication for a data transmission channel, a data type indication, an antenna port indication, or a priority indication.

In the embodiments of the present application, whether a scheduling data type of the DCI being the unicast data transmission or the non-unicast data transmission may be indicated by one or more of the carrier indication, the bandwidth part (BWP) indication, the time domain resource allocation indication, the frequency domain resource allocation indication, the demodulation reference signal (DMRS) sequence related information indication, the scrambling code information indication for the data transmission channel, the data type indication, the antenna port indication, and the priority indication.

Figure 10:
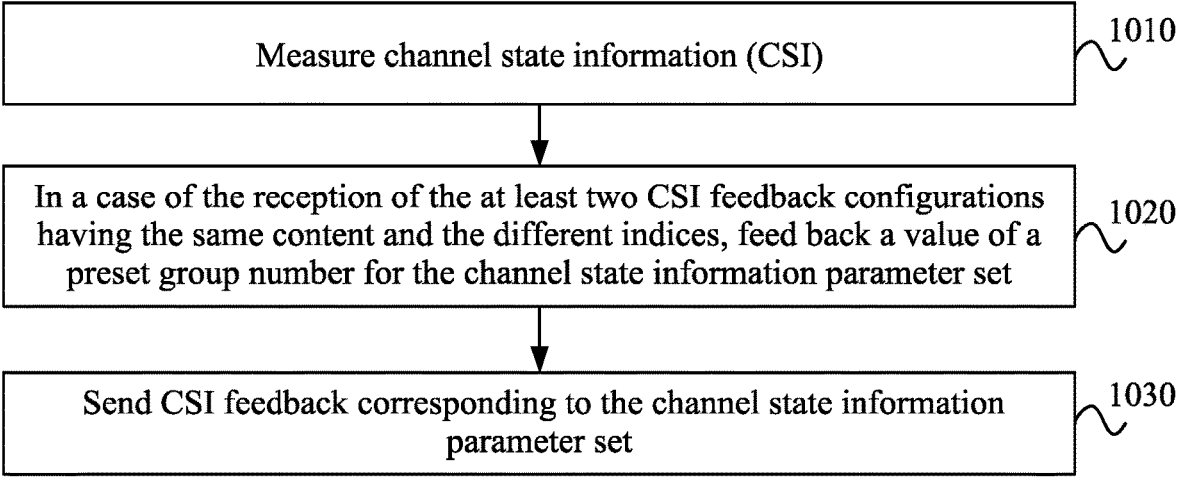
FIG. 10 is a flowchart of another channel state information feedback method according to an embodiment of the present application.

FIG. 10 is a flowchart of another channel state information feedback method according to an embodiment of the present application, the embodiment of the present application is embodied on the basis of the above-described embodiments of the present application, and referring to FIG. 10, the method provided in the embodiments of the present application specifically includes the following.

In 1010, channel state information (CSI) is measured.

In 1020, in a case of the reception of the at least two CSI feedback configurations having the same content and the different indices, a value of a preset group number is fed back for the channel state information parameter set, where the preset group number is a positive integer greater than 1, and the preset group number is predefined by a system or configured through the CSI feedback number parameter.

In an exemplary embodiment, when the terminal receives the at least two CSI feedback configurations having the same content, and indices of the two CSI feedback configurations are different, the channel state information parameter set may be determined to feed back multiple groups of values, and a number of groups of fed-back values may be predefined by the system or configured through the CSI feedback number parameter.

In 1030, CSI feedback corresponding to the channel state information parameter set is sent.

Further, on the basis of the above-described embodiments of the present application, values of the preset group number in an order of good to poor correspond to the CSI feedback configurations having the same content and the different indices in an index order of small to large or in an index order of large to small.

In the embodiments of the present application, when the CSI is fed back, values of the fed-back channel state information may be selected in an order of good to bad, and selected channel state information may correspond to the CSI feedback configurations having the same content and the different indices in an order of small to large or in an order of large to small.

Figure 11:
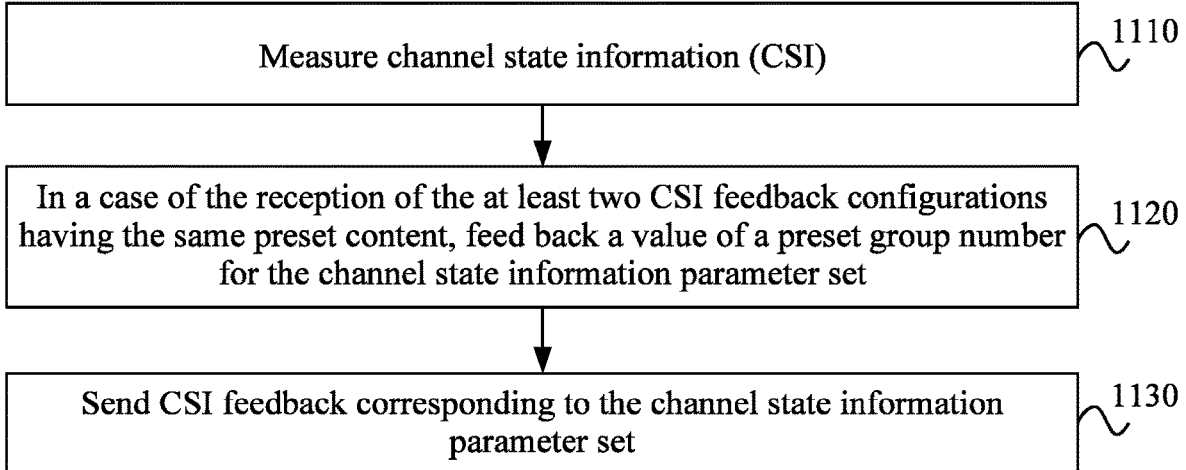
FIG. 11 is a flowchart of another channel state information feedback method according to an embodiment of the present application.

FIG. 11 is a flowchart of another channel state information feedback method according to an embodiment of the present application, the embodiment of the present application is embodied on the basis of the above-described embodiments of the present application, and referring to FIG. 11, the method provided in the embodiments of the present application specifically includes the following.

In 1110, channel state information (CSI) is measured. In process 1120, in a case of the reception of the at least two CSI feedback configurations having the same preset content, a value of a preset group number is fed back for the channel state information parameter set, where the preset group number is a positive integer greater than 1, and the preset group number is predefined by a system or configured through the CSI feedback number parameter.

In an exemplary embodiment, when the terminal receives the at least two CSI feedback configurations, and the at least two CSI feedback configurations includes the same contents, the channel state information parameter set may be determined to feed back multiple groups of values, and a number of groups of fed-back values may be predefined by the system or configured through the CSI feedback number parameter.

Further, on the basis of the above-described embodiments of the present application, the preset content in the reception of the at least two CSI feedback configurations having the same preset content includes at least one of: a CSI feedback format, a channel state information-reference signal (CSI-RS) resource associated with the CSI feedback, a measurement carrier of the CSI feedback, a measurement BWP of the CSI feedback, or usage of the CSI feedback.

Specifically, the preset content may be a content included in the CSI feedback, may be one or more of the CSI feedback format, the CSI-RS resource associated with the CSI feedback, the measurement carrier of the CSI feedback, the measurement BWP of the CSI feedback, and the usage of the CSI feedback.

In 1130, CSI feedback corresponding to the channel state information parameter set is sent.

FIG. 12 is a flowchart of another channel state information feedback method according to an embodiment of the present application, the embodiment of the present application is embodied on the basis of the above-described embodiments of the present application, and referring to FIG. 12, the method provided in the embodiments of the present application specifically includes the following.

In 1200, beam information of a channel state information measurement resource is determined according to beam determination information.

In 1210, the CSI feedback corresponding to the channel state information parameter set is determined according to a set condition.

The beam determination information may be information for determining beam information for the terminal to measure the channel state information, and the beam determination information may include: beam information of a downlink data transmission channel; beam information of DCI scheduling a downlink data transmission channel; or reception of a blind detection opportunity for DCI scheduling a downlink data transmission channel.

Specifically the terminal may determine the beam information according to one or more of the beam information of the downlink data transmission channel, the beam information of the DCI scheduling the downlink data transmission channel, or the reception of the blind detection opportunity for the DCI scheduling the downlink data transmission channel.

Further, on the basis of the above-described embodiments of the present application, the beam determination information may include at least one of: the beam information of the downlink data transmission channel; the beam information of the DCI scheduling the downlink data transmission channel; or the reception of the blind detection opportunity for the DCI scheduling the downlink data transmission channel.

In 1220, CSI feedback corresponding to the channel state information parameter set is sent.

Further, on the basis of the above-described embodiments of the present application, the beam information of the downlink data transmission channel is determined by at least one of: indicated in the DCI scheduling the downlink data transmission channel; indicated in a medium access control (MAC) layer-control element (CE); predefined by a system; or indicated by RRC signaling.

Further, on the basis of the above-described embodiments of the present application, an association of the downlink data transmission channel with the channel state information measurement resource exists, and the association includes at least one of: the downlink data transmission channel and the channel state information measurement resource being sent on a same carrier; the downlink data transmission channel and the channel state information measurement resource being sent on a same BWP; the downlink data transmission channel and the channel state information measurement resource being sent on a same frequency domain resource; the downlink data transmission channel and the channel state information measurement resource being of a same type, where the type is a non-unicast type and is indicated by RRC configuration signaling or the DCI scheduling the downlink data transmission channel; the DCI scheduling the downlink data transmission channel and the channel state information measurement resource being sent on same carrier; the DCI scheduling the downlink data transmission channel and the channel state information measurement resource being sent on a same BWP; or the DCI scheduling the downlink data transmission channel and the channel state information measurement resource being sent on a same frequency domain resource.

Further, on the basis of the above-described embodiments of the present application, the channel state information measurement resource includes at least one of: a periodic CSI-RS resource, an aperiodic CSI-RS resource, or a semi-persistent CSI-RS resource.

In an exemplary embodiment, the trigger state being associated with one CSI-ReportConfig is used as an example, the base station instructs the CSI feedback number parameter to the terminal through RRC signaling, the CSI feedback number parameter is used for indicating values of several channel state information parameter sets contained in the relevant CSI Report that the terminal needs to feedback, one or more pieces of channel state information such as CQI, PMI, and RI are contained in the channel state information parameter set, the channel state information contained in the channel state information parameter set may be a subset of all channel state information that the terminal needs to feedback in the relevant CSI Report. For example, the terminal needs to feedback four channel state information, i.e., CRI, RI, PMI, and CQI in the relevant CSI Report, and the channel state parameter set contains PMI and CQI, then for other channel state information not contained in the channel state information parameter set, such as CRI, RI here, the terminal only needs to feedback 1 value in the relevant CSI Report; while for the channel state information contained in the channel state information parameter set, such as PMI and CQI here, the terminal needs to determine to feedback several sets of values according to the configuration of the CSI feedback number parameter. Which channel state information contained in the channel state information parameter set may be predefined by the system or semi-statically configured by the base station. Specifically, which channel state information making up the channel state information parameter set may be predefined by the system or semi-statically configured by the base station for each feedback format. Further, if multiple pieces of channel state information is contained in the channel state information parameter set, whereas the multiple pieces of channel state information is determined to be dependent on each other, for example, the value of the channel state information parameter 1 needs to be determined by the value of the channel state information parameter 2, then the terminal has to feed back several different values for the channel state information parameter 2, the value of the channel state information parameter 1 is obtained at the value of each channel state information parameter 2, and thus the terminal obtains multiple sets of values of {the channel state information parameter 1, the channel state information parameter 2} and feeds back the multiple sets of values to the base station. Specifically, the channel state information parameter set may include a PMI and a CQI, and one value of the PMI corresponds to one value of the CQI, which indicates that the value of the CQI is calculated based on the value of the PMI.

Specifically, the method for indicating the CSI feedback number parameter to the terminal by the base station is achieved by the following methods:

Method 1

It is determined by whether the base station configures RRC signaling corresponding to the CSI feedback number parameter for the terminal.

If the base station configures the RRC signaling corresponding to the CSI feedback number parameter for the terminal, then the terminal feeds back N sets of values for all channel state information contained in the channel state information parameter set in the relevant CSI Report. Specifically, N may be equal to a value predefined by a system, for example, N may be equal to 2 or 3 or 4. Further, N values of one piece of channel state information may be optimal N values. An optimal value of the channel state information refers to one or more of an optimal modulation order that may be achieved under a condition of a certain error rate, an optimal coding code rate that may be achieved under the condition of the certain error rate, and an optimal transport block size that may be achieved under the condition of the certain error rate. The relevant CSI Report refers to a target CSI Report which is configured by the base station and takes effect through RRC signaling of the corresponding CSI feedback number parameter, and the relevant CSI Report may be one or more CSI reports.

Specifically, when multiple pieces of channel state information is contained in the channel state information parameter set, for example, CQI and PMI are contained in the channel state information parameter set, where the value of the CQI needs to be determined based on the value of the PMI, then the UE traverses all value ranges of the PMI to obtain an optimal value of the CQI corresponding to each value of the PMI, i.e. {value n of the PMI, optimal value of the CQI}. If the value range of the PMI includes 4 candidate values of the PMI, then the UE will obtain 4 sets of {value n of the PMI, optimal value of the CQI}, where n is 1 to 4. If the CSI feedback number parameter indicates that the terminal feeds back 3 sets of values for the channel state information parameter set, then the terminal must feed back optimal front 3 sets of {PMI value n, optimal CQI value} for PMI and CQI feedback. Further, the terminal feeds back optimal 3 sets of {value n of the PMI, optimal value of the CQI}, where the 'value n of the PMI' in each set is different or belongs to different PMI candidate sets. PMIs in different PMI candidate sets are orthogonal to each other. This way, the base station may obtain more precoding information, whereby the base station is convenient to coordinate a pre-coding weight when scheduling a group of users.

If the base station does not configure the RRC signaling corresponding to the CSI feedback number parameter for the terminal, then the terminal only feeds back 1 set of values for all channel state information contained in the channel state information parameter set in the relevant CSI Report, that is, the terminal only feeds back 1 value for all channel state information needing to be fed back in the relevant CSI Report. Further, the 1 set of values may be 1 set of optimal values. In the above-described specific example, the terminal feeds back 1 set of optimal {value n of the PMI, optimal value of the CQI}.

Method 2

It is determined by RRC signaling corresponding to the CSI feedback number parameter configured by the base station to the terminal.

The base station configures the RRC signaling corresponding to the CSI feedback number parameter for the terminal, a value of this parameter indicates that the terminal needs to feedback several sets of values for all channel state information contained in the channel state information parameter set in the relevant CSI Report. If the parameter is indicated to be 1, then the terminal feeds back 1 set of values for all channel state information contained in the channel state information parameter set in the relevant CSI Report. If the parameter is indicated to be N, then the terminal feeds back N sets of values for all channel state information contained in the channel state information parameter set in the relevant CSI Report, N is greater than 1, for example, N is 2 or 3 or 4. A method for determining the N sets of values is the same as the method 1.

Method 3

It is determined by whether the base station configures RRC signaling corresponding to the CSI feedback number parameter for the terminal and by a specific value of the signaling in a case where the information is configured.

If the base station does not configure with the RRC signaling corresponding to the CSI feedback number parameter for the terminal, then the terminal feeds back only 1 set of values for all channel state information contained in the channel state information parameter set in the relevant CSI Report, i.e., the terminal only feeds back one value for all channel state information that needs to be fed back in the relevant CSI Report. Further, the one value may be an optimal value of the channel state information, and the optimal value of the channel state information refers to one or more of an optimal modulation order that may be achieved under a condition of a certain error rate, an optimal coding code rate that may be achieved under the condition of the certain error rate, and an optimal transport block size that may be achieved under the condition of the certain error rate.

The base station configures the RRC signaling corresponding to the CSI feedback number parameter for the terminal, and the parameter is indicated to be N, then the terminal needs to feedback N sets of values for all channel state information contained in the channel state information parameter set in the relevant CSI Report. A method for determining the N sets of values is the same as the method 1.

Specifically, the RRC signaling corresponding to the feedback CSI number parameter may be introduced in the RRC cell CSI-ReportConfig.

In an exemplary embodiment, the trigger state being associated with multiple CSI-ReportConfigs is used as an example, the base station indicates that the terminal needs to feed back multiple sets of values to all channel state information included in one channel state information parameter set by configuring multiple feedback contents and/or feedback quantities for the terminal to calculate CSI-ReportConfigs with same configuration requirements but different CSI-ReportConfig ids. Which channel state information included in the channel state information parameter set may be predefined by the system, or semi-statically configured by the base station, or configured by reportQuantity in CSI-ReportConfig, or configured by other RRC signaling, for example, when the reportQuantity in the CSI-ReportConfig contains PMI, CQI, the channel state information parameter set is PMI and CQI. The terminal feeds back only one value or an indicated number of values still according to an indication of the reportQuantity in the CSI-ReportConfig for the channel state information not belonging to the channel state information parameter set.

When the terminal recognizes that the contents of N CSI-report configs with the same content but different CSI-report config ids configured for the terminal by the base station, N is an integer greater than 1, the terminal knows that the base station needs to feed back multiple values for all channel state information included in one channel state information parameter set. Based on a system predefinition or a semi-static configuration of a base station, the terminal feeds back values of good to poor for the channel state information contained in the channel state information parameter set in a CSI-report configuration order of small to large or in a CSI-report configuration order of large to small, and feeds back values from good to bad, and feeds back a same value for each CSI-ReportConfig in terms of other channel state information not belonging to the channel state information parameter set and needing to be fed back.

For example, feedback content requirements included in CSI-ReportConfig 1, CSI-ReportConfig 3, CSI-ReportConfig 4 configured to the terminal by the base station are exactly the same, the terminal then knows that the terminal needs to, according to configurations of these CSI-ReportConfigs, feed back multiple values for channel state information contained in a certain channel state information parameter set and feed back, still according to the indication of the reportQuantity in the CSI-ReportConfig, only one value or a specified number of values for the channel state information not belonging to the channel state information parameter set. If the UE determines that the channel state information parameter set includes the CQI and the PMI, the channel state information not belonging to the channel state information parameter set is a channel state information reference signal resource sequence CRI and a channel state information reference signal resource sequence RI, then the terminal determines three sets of values of {CQI, PMI} according to a measurement result, thus the determination of the value of the CQI relies on the value of the PMI, and thus the terminal ensures that values of the PMI in these 3 sets of values are different. Based on such a principle, the UE obtains three sets of values of {CQI, PMI} under a corresponding same set of {CRI, RI}, i.e., {CQI 1, PMI 1}, {CQI 2, PMI 2}, and {CQI 3, PMI 3}. Where, {CQI 1, PMI 1} corresponds to an optimal modulation mode considered achievable by the terminal, an optional coding code rate considered achievable by the terminal, and is used as CSI feedback corresponding to the CSI-ReportConfig 1; where {CQI 2, PMI 2} corresponds to a second optional modulation mode considered achievable by the terminal, a second optional coding code rate considered achievable by the terminal, and is used as CSI feedback corresponding to the CSI-ReportConfig 3; where {CQI 3, PMI 3} corresponds to a third optional modulation mode considered achievable by the terminal, a third optional coding code rate considered achievable by the terminal, and is used as CSI feedback corresponding to the CSI-ReportConfig 4. Since the calculation of the CQI needs to rely on the value of the PMI, the PMI 1, the PMI 2 and the PMI 3 are not equal to each other, the UE obtains a value of the CQI 1 based on a value of the PMI 1, a value of the CQI 2 based on a value of the PMI 3, and a value of the CQI 3 based on a value of the PMI 3. The values of the CQI 1, the CQI 2 and the CQI 3 may be equal or unequal.

In an exemplary embodiment, the DCI being indicating a group number of a fed-back value of the channel state information in the channel state information parameter set is used as an example, the base station explicitly or implicitly indicates whether the terminal feeds back 1 set of values or multiple sets of values for all channel state information contained in one piece of channel state information parameter set by using the DCI triggering the CSI feedback or the DCI scheduling the data transmission. Specifically, the following methods are provided.

Method 1: Indicated by RNTI Scrambled With the DCI

The terminal determines, according to the RNTI scrambled with the DCI, whether one set of values or multiple sets of values are fed back for all channel state information contained in one piece of channel state information parameter set.

If the RNTI scrambled with the DCI is a UE-specific RNTI, such as C-RNTI, CS-RNTI, MCS-C-RNTI, then the terminal considers that one set of values are fed back for all channel state information included in the channel state information parameter set in the CSI feedback triggered by the DCI or in the CSI feedback associated with the DCI.

If the RNTI scrambled with the DCI is a non-UE-specific RNTI, such as a group-common RNTI, i.e., an RNTI used by multiple users, then the terminal considers that N sets of values are fed back for all channel state information included in the channel state information parameter set in the CSI feedback triggered by the DCI or in the CSI feedback associated with the DCI. How the N sets of values being obtained is the same as the embodiments 1 and 2.

Method 2: Indicated by the Scheduling Data Type Identifier

One or more domains in the DCI may indicate whether a data transmission scheduled by the DCI is a unicast data transmission or a non-unicast data transmission, and the non-unicast data transmission may be a multicast data transmission or a broadcast data transmission. The domain may be a carrier indication domain, a BWP indication domain, a time domain resource allocation indication domain, a frequency domain resource allocation indication domain, a demodulation reference signal (DMRS) sequence related information indication domain, a scrambling code information indication domain for a data transmission channel, a data type indication domain, an antenna port indication domain, a priority indication domain, and the like.

If the domain of the DCI indicates that the unicast data transmission is scheduled, then the terminal considers that one set of values are fed back for all channel state information contained in the channel state information parameter set in the CSI feedback triggered by the DCI or in the CSI feedback associated with the DCI.

If the domain of the DCI schedules the non-unicast data transmission, then the terminal considers that N sets of values are fed back for all channel state information contained in the channel state information parameter set in the CSI feedback triggered by the DCI or in the CSI feedback associated with the DCI. The N sets of values are predefined by a system or configured through the CSI feedback number parameter.

Method 3: Indicated by the Format of the DCI

Whether the terminal feeds back 1 set of values or multiple sets of values for all channel state information contained in one channel state information parameter set is implicitly indicated according to the format of the DCI used by the base station to send the DCI.

If the format of the DCI used to send the DCI is a type 1 and its corresponding payload is a value of 1, then the terminal considers that 1 set of values are fed back for all channel state information contained in the channel state information parameter set in the CSI feedback triggered by the DCI or in the CSI feedback associated with the DCI.

If the format of the DCI used to send the DCI is a type 2 and its corresponding payload is a value of 2, then the terminal considers that N sets of values are fed back for all channel state information contained in the channel state information parameter set in the CSI feedback triggered by the DCI or in the CSI feedback associated with the DCI. How the N sets of values being obtained is the same as the embodiments 1 and 2.

The type 1 of the format of the DCI and the type 2 of the format of the DCI are different and may be predefined by a system or de-blind detected by the base station semi-statically configuring the terminal. The value 1 of the payload and the value 2 of the payload are different and may be predefined by a system or semi-statically configured by the base station.

Method 4: Indicated by a Time-Frequency Resource for Sending the DCI

Whether the terminal feeds back 1 set of values or multiple sets of values for all channel state information contained in one channel state information parameter set is implicitly indicated through whether the base station sends the DCI on a time-frequency resource 1 or a time-frequency resource 2. The time-frequency resource 1 and the time-frequency resource 2 are predefined by the system or semi-statically configured by the base station to the terminal, and specifically, the time-frequency resource 1 and the time-frequency resource 2 may be a specific CORESET configuration, a search space configuration, an aggregation level configuration, a blind detection opportunity configuration, and a REG configuration used to send the DCI, etc.

If the base station sends the DCI on the time-frequency resource 1 and the terminal blindly detects the DCI on the time-frequency resource 1, then the terminal considers that 1 set of values are fed back for all channel state information contained in the channel state information parameter set in the CSI feedback triggered by the DCI or in the CSI feedback associated with the DCI.

If the base station sends the DCI on the time-frequency resource 1 and the terminal blindly detects the DCI on the time-frequency resource 1, then the terminal considers that N sets of values are fed back for all channel state information contained in the channel state information parameter set in the CSI feedback triggered by the DCI or in the CSI feedback associated with the DCI. The value of N may be predefined by a system or configured through the CSI feedback number parameter.

In an exemplary embodiment, an example in which the enhancement of a sending beam of the CSI-RS is implemented by the CSI-RS resource in agreement with a sending beam of the PDSCH is used, in terms of the periodic CSI-RS resource for measuring the channel state information, the semi-persistent CSI-RS resource for measuring the channel state information, or the aperiodic CSI-RS resource for measuring the channel state information, sending beam information thereof may be associated with beam information sending the downlink data transmission channel. Specifically, the sending beam information may be quasi colocation (QCL) information or other information for reflecting a beam direction. Specifically, the base station may send the periodic CSI-RS resource, the semi-persistent CSI-RS resource, or the aperiodic CSI-RS resource by using the beam information sending the downlink data transmission channel, whereby the terminal may receive the periodic CSI-RS resource, the semi-persistent CSI-RS resource, or the aperiodic CSI-RS resource based on the beam information sending the downlink data transmission channel, and further the terminal measures the channel state information based on the beam information of the downlink data transmission channel and based on the periodic CSI-RS resource, the semi-persistent CSI-RS resource, or the aperiodic CSI-RS resource. The measurement of the channel state information includes a measurement of information such as CQI and PMI. Specifically, the base station configures the terminal with one or more periodic CSI-RS resources, semi-persistent CSI-RS resources, or aperiodic CSI-RS resources for measuring the channel state information on a specific frequency domain resource, multiple periodic CSI-RS resources may belong to a same periodic CSI-RS resource Set, multiple semi-persistent CSI-RS resources may belong to a same semi-persistent CSI-RS resource Set, and multiple aperiodic CSI-RS resources may belong to a same aperiodic CSI-RS resource Set. The base station configures a frequency-domain resource in which the CSI-RS resource, the semi-persistent CSI-RS resource, or the aperiodic CSI-RS resource is sent by using the RRC signaling, so that the terminal may measure the channel state information on the frequency-domain resource.

The base station schedules the downlink data transmission channel on a specific frequency domain resource, and schedules through the DCI, and the scheduling DCI may be sent on one or more opportunities in a set of PDCCH blind detection opportunities. A frequency domain resource used for transmitting the downlink data transmission channel may be indicated in the DCI. At least one of the following methods is adopted to determine beam information of the periodic CSI-RS resource, the semi-persistent CSI-RS resource, or the aperiodic CSI-RS resource.

The base station indicates in the scheduling DCI or MAC CE which beam information the terminal employs to transmit the downlink data transmission channel, The base station indicates that the terminal employs which beam information to send the downlink data transmission channel in the scheduling DCI or MAC CE, and accordingly, the base station also sends the periodic CSI-RS resource, the semi-persistent CSI-RS resource, or the aperiodic CSI-RS resource using the same beam information, and then the terminal receives the periodic CSI-RS resource, the semi-persistent CSI-RS resource, or the aperiodic CSI-RS resource according to the beam information. If the beam information of the periodic CSI-RS resource, the semi-persistent CSI-RS resource, or the aperiodic CSI-RS resource configured by the base station with the RRC signaling is different from beam information indicated in the scheduling DCI or MAC CE, then the terminal ignores the beam information of the periodic CSI-RS resource, the semi-persistent CSI-RS resource, or the aperiodic CSI-RS resource configured by the RRC signaling. The terminal determines, according to a sending frequency domain resource configuration of the periodic CSI-RS resource, the semi-persistent CSI-RS resource, or the aperiodic CSI-RS resource, and a sending frequency domain resource configuration of the downlink data transmission, that the periodic CSI-RS resource, the semi-persistent CSI-RS resource, or the aperiodic CSI-RS resource adopt the same sending beam information as which downlink data transmission. Therefore, as the beam information indicated in the scheduling DCI or MAC CE is different, the periodic CSI-RS resource, the semi-persistent CSI-RS resource, or the aperiodic CSI-RS resource sent on a same frequency domain resource may also be sent by using different beam information.

A correspondence of beam information sending the periodic CSI-RS resource, the semi-persistent CSI-RS resource, or the aperiodic CSI-RS resource and PDCCH blind detection opportunities sending the scheduling DCI is pre-defined by the system or semi-statically configured by the base station with the RRC signaling. For example, the base station semi-statically configures a periodic CSI-RS resource 1 for a PDCCH blind detection opportunity 1 within a specific window length, a periodic CSI-RS resource 2 for a PDCCH blind detection opportunity 2 within a specific window length, and a periodic CSI-RS resource 3 for a PDCCH blind detection opportunity 3 within a specific window length. The periodic CSI-RS resource, the semi-persistent CSI-RS resource, or the aperiodic CSI-RS resource may be sent using beam information indicated in a scheduling DCI blindly detected on its associated PDCCH blind detection opportunity. If the terminal blindly detects the scheduling DCI on the PDCCH blind detection opportunity 2, and the beam information 2 is indicated in the scheduling DCI, then the periodic CSI-RS resource 2 is sent by using the beam information 2, and the terminal receives the periodic CSI-RS resource 2 by using the corresponding beam information. Thus, as the beam information indicated in the scheduling DCI is different, and the associated periodic CSI-RS resource may be sent with different beam information.

In another exemplary embodiment, in terms of the periodic CSI-RS resource for measuring the channel state information, the semi-persistent CSI-RS resource for measuring the channel state information, or the aperiodic CSI-RS resource for measuring the channel state information, the sending beam information thereof may be associated with sending beam information of scheduling DCI that schedules the downlink data transmission channel.

Specifically, the downlink data transmission channel sent by the base station on the particular frequency domain resource is scheduled with the DCI, the scheduling DCI may be sent on one or more opportunities in a set of PDCCH blind detection opportunities. For different PDCCH blind detection opportunities, the base station may send the scheduling DCI using different beam information.

A correspondence of beam information sending the periodic CSI-RS resource, the semi-persistent CSI-RS resource, or the aperiodic CSI-RS resource and PDCCH blind detection opportunities is pre-defined by the system or semi-statically configured by the base station. For example, the base station semi-statically configures, by using the RRC signaling, a periodic CSI-RS resource 1 to correspond to a PDCCH blind detection opportunity 1 within a window length, a periodic CSI-RS resource 2 to correspond to a PDCCH blind detection opportunity 2 within a window length, and a periodic CSI-RS resource 3 to correspond to a PDCCH blind detection opportunity 3 within a window length. The base station then sends the periodic CSI-RS resource 1 by sending beam information of the DCI on the PDCCH blind detection opportunity 1, the periodic CSI-RS resource 2 by sending beam information of the DCI on the PDCCH blind detection opportunity 2, and the periodic CSI-RS resource 3 by sending beam information of the DCI on the PDCCH blind detection opportunity 3. If sending beam information configured by the base station for the periodic CSI-RS resource 1 is not equal to the beam information that sends the DCI on the PDCCH blind detection opportunity 1, then the terminal ignores the sending beam information configured by the base station for the periodic CSI-RS resource 1 but adopts the beam information that receives the associated PDCCH blind detection opportunity to receive the periodic CSI-RS resource 1.

When the base station determines to send the DCI using a certain blind detection opportunity, then the base station uses beam information corresponding to the blind detection opportunity to send the associated one or more periodic CSI-RS resources, semi-persistent CSI-RS resources, or aperiodic CSI-RS resources. If the beam information of the periodic CSI-RS resource, the semi-persistent CSI-RS resource, or the aperiodic CSI-RS resource configured by the base station using the RRC signaling is different from the beam information corresponding to the PDCCH blind detection opportunity, then the terminal ignores the beam information of the periodic CSI-RS resource configured by the RRC signaling but receives the periodic CSI-RS resource according to the beam information corresponding to the blind detection opportunity. The downlink data transmission channel is associated with a channel state information measurement resource, such as the periodic CSI-RS resource, the aperiodic CSI-RS resource, the semi-persistent CSI-RS resource, the association includes at least one of: the downlink data transmission channel and the channel state information measurement resource being sent on a same carrier; the downlink data transmission channel and the channel state information measurement resource being sent on a same BWP; the downlink data transmission channel and the channel state information measurement resource being sent on a same frequency domain resource; the downlink data transmission channel and the channel state information measurement resource being of a same type, where the type is a non-unicast type and is indicated by RRC configuration signaling or the DCI scheduling the downlink data transmission channel; the DCI scheduling the downlink data transmission channel and the channel state information measurement resource being sent on same carrier; the DCI scheduling the downlink data transmission channel and the channel state information measurement resource being sent on a same BWP; or the DCI scheduling the downlink data transmission channel and the channel state information measurement resource being sent on a same frequency domain resource.

FIG. 13 is a schematic structural diagram of a channel state information feedback apparatus according to an embodiment of the present application. The apparatus may perform the channel state information feedback method provided in any of the embodiments of the present application and have functional modules and beneficial effects corresponding to the execution method. The apparatus may be implemented by software and/or hardware, and is generally integrated in a remote server, and specifically includes an information measurement module 131 and a feedback sending module 132.

The information measurement module 131 is configured to measure channel state information (CSI).

The feedback sending module 132 is configured to send CSI feedback corresponding to a channel state information parameter set.

According to the embodiments of the present application, the information measurement module is configured to measure the channel state information, the feedback sending module is configured to feed back the acquired channel state information to a base station, so that the feedback of the channel state information is achieved, the feedback content is enriched through the channel state information parameter set, the measurement of the channel state information is enhanced, and the accuracy of scheduling decisions made by the base station under the broadcast multicast service is improved.

Further, on the basis of the above-described embodiments of the present application, the apparatus further includes a feedback determination module. The feedback determination module is configured to determine the CSI feedback corresponding to the channel state information parameter set according to a set condition.

Further, on the basis of the above-described embodiments of the present application, the set condition in the feedback determination module at least includes one of: a configuration of a CSI feedback number parameter; a parameter value of a CSI feedback number parameter; reception of a scrambling configuration of an association downlink control information (DCI); a scheduling data type identifier in association DCI; reception of a format of association DCI; reception of a time-frequency domain resource of association DCI; reception of at least two CSI feedback configurations having a same content and different indices; or reception of at least two CSI feedback configurations having a same preset content, where the preset content includes at least one content of the at least two CSI feedback configurations.

Further, on the basis of the above-described embodiments of the present application, the CSI feedback in the feedback sending module 132 includes at least one CSI report, and a CSI feedback number parameter of the CSI feedback is configured through radio resource control layer (RRC) signaling.

Further, on the basis of the above-described embodiments of the present application, the CSI feedback number parameter of the CSI feedback in the feedback sending module 132 is configured for a specific CSI report, or the CSI feedback number parameter is configured for all CSI reports.

Further, on the basis of the above-described embodiments of the present application, the channel state information parameter set in the feedback sending module 132 includes one piece of channel state information, and the one piece of channel state information is configured based on a system pre-definition and/or RRC signaling.

Further, on the basis of the above-described embodiments of the present application, the feedback determination module includes a first value unit, the first value unit is configured to: in a case where a CSI feedback number parameter of the CSI feedback indicates that the channel state information parameter set feeds back a set of values, feed back a set of optimal values for the channel state information parameter set.

Further, on the basis of the above-described embodiments of the present application, the feedback determination module includes a second value unit, the second value unit is configured to: in a case where a CSI feedback number parameter of the CSI feedback indicates that the channel state information parameter set feeds back at least two sets of values, feed back an optimal value of a preset group number for the channel state information parameter set, where the preset group number is a positive integer greater than 1, and the preset group number is predefined by a system or configured through the CSI feedback number parameter.

Further, on the basis of the above-described embodiments of the present application, the optimal value of the first value unit and/or the second value unit includes one or more of a modulation order under a condition of a preset error rate, a coding code rate under the condition of the preset error rate, or a transport block size under the condition of the preset error rate.

Further, on the basis of the above-described embodiments of the present application, the association DCI of the CSI feedback in the feedback sending module 132 includes DCI triggering the CSI feedback and/or DCI scheduling a data transmission.

Further, on the basis of the above-described embodiments of the present application, the feedback determination module is specifically configured to: in a case where a radio network temporary identifier (RNTI) scrambled with the association DCI is a first-type RNTI, feed back a set of values for the channel state information parameter set; and in a case where the radio network temporary identifier (RNTI) scrambled with the association DCI is a second-type RNTI, feed back a value of a preset group number for the channel state information parameter set, where the preset group number is a positive integer greater than 1, and the preset group number is predefined by a system or configured through the CSI feedback number parameter.

Further, on the basis of the above-described embodiments of the present application, the first-type RNTI at least includes one of a C-RNTI, a CS-RNTI, or an MCS-C-RNTI, and the second-type RNTI includes a non-terminal-specific RNTI.

Further, on the basis of the above-described embodiments of the present application, the feedback determination module is specifically configured to: in a case where the scheduling data type identifier indicates that scheduling data is a unicast data transmission, feed back a set of values for the channel state information parameter set; and in a case where the scheduling data type identifier indicates that scheduling data is a non-unicast data transmission, feed back a value of a preset group number for the channel state information parameter set, where the preset group number is a positive integer greater than 1, and the preset group number is predefined by a system or configured through the CSI feedback number parameter.

Further, on the basis of the above-described embodiments of the present application, the scheduling data type identifier at least includes one of: a carrier indication, a bandwidth part (BWP) indication, a time domain resource allocation indication, a frequency domain resource allocation indication, a DMRS sequence related information indication, a scrambling code information indication for a data transmission channel, a data type indication, an antenna port indication, or a priority indication.

Further, on the basis of the above-described embodiments of the present application, the feedback determination module is specifically configured to: in a case where the format of the association DCI is a first-type format, feed back a set of values for the channel state information parameter set; and in a case where the format of the association DCI is a second-type format, feed back a value of a preset group number for the channel state information parameter set, where the preset group number is a positive integer greater than 1, and the preset group number is predefined by a system or configured through the CSI feedback number parameter; where the first-type format and the second-type format include different number of bits.

Further, on the basis of the above-described embodiments of the present application, the feedback determination module is specifically configured to: in a case where the association DCI is detected on a first time-frequency domain resource, feed back a set of values for the channel state information parameter set; and in a case where the association DCI is detected on a second time-frequency domain resource, feed back a value of a preset group number for the channel state information parameter set, where the preset group number is a positive integer greater than 1, and the preset group number is predefined by a system or configured through the CSI feedback number parameter; where the first time-frequency domain resource and the second time-frequency domain resource are set based on different pieces of configuration information.

Further, on the basis of the above-described embodiments of the present application, the configuration information at least includes one of: a control resource set (CORESET), a search space, an aggregation level, a blind detection opportunity, or a resource element group (REG).

Further, on the basis of the above-described embodiments of the present application, the feedback determination module is specifically configured to: in a case of the reception of the at least two CSI feedback configurations having the same content and the different indices, feed back a value of a preset group number for the channel state information parameter set, where the preset group number is a positive integer greater than 1, and the preset group number is predefined by a system or configured through the CSI feedback number parameter.

Further, on the basis of the above-described embodiments of the present application, the preset content in the reception of the at least two CSI feedback configurations having the same preset content includes at least one of: a CSI feedback format, a channel state information-reference signal (CSI-RS) resource associated with the CSI feedback, a measurement carrier of the CSI feedback, a measurement BWP of the CSI feedback, or usage of the CSI feedback.

Further, on the basis of the above-described embodiments of the present application, values of the preset group number in an order of good to poor correspond to the CSI feedback configurations having the same content and the different indices in an index order of small to large or in an index order of large to small.

Further, on the basis of the above-described embodiments of the present application, the information measurement module 131 includes a beam wave information unit, the beam wave information unit is configured to determine beam information of a channel state information measurement resource according to beam determination information.

Further, on the basis of the above-described embodiments of the present application, the beam determination information includes at least one of: beam information of a downlink data transmission channel; beam information of DCI scheduling a downlink data transmission channel; or reception of a blind detection opportunity for DCI scheduling a downlink data transmission channel.

Further, on the basis of the above-described embodiments of the present application, the beam information of the downlink data transmission channel is determined by at least one of: indicated in the DCI scheduling the downlink data transmission channel; indicated in a medium access control (MAC) layer-control element (CE); predefined by a system; or indicated by RRC signaling.

Further, on the basis of the above-described embodiments of the present application, an association of the downlink data transmission channel with the channel state information measurement resource exists, and the association includes at least one of: the downlink data transmission channel and the channel state information measurement resource being sent on a same carrier; the downlink data transmission channel and the channel state information measurement resource being sent on a same BWP; the downlink data transmission channel and the channel state information measurement resource being sent on a same frequency-domain resource; the downlink data transmission channel and the channel state information measurement resource being of a same type, where the type is a non-unicast type and is indicated by RRC configuration signaling or the DCI scheduling the downlink data transmission channel; the DCI scheduling the downlink data transmission channel and the channel state information measurement resource being sent on same carrier; the DCI scheduling the downlink data transmission channel and the channel state information measurement resource being sent on a same BWP; or the DCI scheduling the downlink data transmission channel and the channel state information measurement resource being sent on a same frequency-domain resource.

Further, on the basis of the above-described embodiments of the present application, the channel state information measurement resource includes at least one of: a periodic CSI-RS resource, an aperiodic CSI-RS resource, or a semi-persistent CSI-RS resource.

FIG. 14 is a schematic structural diagram of a device according to an embodiment of the present application, as shown in FIG. 14, the device includes a processor 140, a memory 141, an input apparatus 142 and an output apparatus 143. A number of processors 140 in the device may be one or more, one processor 140 is used as an example in FIG. 14; the processor 140, the memory 141, the input apparatus 142 and the output apparatus 143 in the device may be connected by a bus or otherwise, and they being connected by a bus is used as an example in FIG. 14.

The memory 141 serves as a computer-readable storage medium and may be used for storing a software program, a computer executable program and a module, such as a module corresponding to the channel state information feedback apparatus in the embodiments of the present application (such as, the information measurement module 131 and the feedback sending module 132). The processor 140 executes various functional applications and data processing of the device, i.e., implements the method described above, by executing software programs, instructions, and modules stored in the memory 141.

The memory 141 may mainly include a storage program region and a storage data region, where the storage program region may store an operating system, an application program required for at least one function; and the storage data region may store data or the like created according to the use of a terminal. Moreover, the memory 141 may include a high-speed random access memory and may also include a non-volatile memory, such as at least one magnetic disk storage device, flash memory device, or other non-volatile solid-state memory devices. In some instances, the memory 141 may further include a memory remotely disposed with respect to the processor 140, the remote memory may be connected to the device over a network. Instances of the above-described networks include, but are not limited to, an Internet, an intranet, a local area network, a mobile communication network, and combinations thereof.

The input apparatus 142 may be configured to receive input numeric or character information and generate key signal inputs related to user settings and function controls of the device. The output apparatus 143 may include a display device such as a display screen.

An embodiment of the present application further provides a computer-readable storage medium. A computer-executable instruction is configured to perform, when executed by a computer processor, the channel state information feedback method, the method includes that: channel state information (CSI) is measured; and CSI feedback corresponding to a channel state information parameter set is sent.

Of course, in the storage medium containing the computer-executable instruction provided in the embodiments of the present application, the computer-executable instruction is not limited to the method operations described above, and may also perform related operations in the channel state information feedback method provided in any of the embodiments of the present application.

The above description is only an exemplary embodiment of the present application, and is not intended to limit the scope of protection of the present application.

It should be appreciated by those skilled in the art that the term "user side" encompasses any suitable type of wireless user equipment, such as mobile telephones, portable data processing devices, portable web browsers or vehicle mobile stations.

In general, various embodiments of the present application may be implemented in hardware or special purpose circuits, software, logic or any combination thereof. For example, some aspects may be implemented in hardware, while other aspects may be implemented in firmware or software which may be executed by a controller, microprocessor or other computing device, although the present application is not limited thereto.

Embodiments of the present application may be implemented by means of executing computer program instructions by a data processor of a mobile device, for example, may be implemented in a processor entity, or by hardware, or by a combination of software and hardware. The computer program instructions may be assembler instructions, industry standard architecture (ISA) instructions, machine instructions, machine-related instructions, microcode, firmware instructions, state setting data, or source or object codes written in any combination of one or more programming languages.

Any block diagram of the logic flow in the accompanying drawings of the present application may represent program steps, or may represent interconnected logic circuits, modules, and functions, or may represent a combination of program steps and logic circuits, modules, and functions. The computer program may be stored on a memory. The memory may be of any type suitable for the local technical environment and may be implemented using any suitable data storage technology, such as, but not limited to, a read-only memory (ROM), a random access memory (RAM), an optical memory device and system (digital video disc (DVD) or compact disc (CD)), etc. Computer readable media may include non-instantaneous storage media. The data processor may be of any type suitable for the local technical environment, such as, but not limited to, general-purpose computers, specialized computers, microprocessors, digital signal processors (DSP), application specific integrated circuits (ASIC), field-programmable gate array (FPGA)), and processors based on multi-core processor architectures.

What is claimed is:

1. A channel state information feedback method, comprising:

measuring channel state information (CSI);

determining CSI feedback corresponding to a channel state information parameter set according to a set condition; and sending the CSI feedback corresponding to the channel state information parameter set;

wherein the set condition at least comprises one of:

a configuration of a CSI feedback number parameter;

a parameter value of a CSI feedback number parameter;

reception of a scrambling configuration of an association downlink control information (DCI);

a scheduling data type identifier in association DCI;

reception of a format of association DCI;

reception of a time-frequency domain resource of association DCI;

reception of at least two CSI feedback configurations having a same content and different indices; or reception of at least two CSI feedback configurations having a same preset content, wherein the preset content comprises at least one content of the at least two CSI feedback configurations;

wherein in a case where the CSI feedback number parameter of the CSI feedback indicates that the channel state information parameter set feeds back a set of values, feeding back a set of optimal values for the channel state information parameter set;

wherein the channel state information feedback method further comprises: in a case where the CSI feedback number parameter of the CSI feedback indicates that the channel state information parameter set feeds back at least two sets of values, feeding back optimal value of a preset group number for the channel state information parameter set, wherein the preset group number is a positive integer greater than 1, and the preset group number is predefined by a system or configured through the CSI feedback number parameter;

wherein in a case where the channel state information parameter set at least comprises two pieces of channel state information and a dependency between values of multiple pieces of channel state information exists, a value of dependent channel state information is determined based on at least two values of depended channel state information corresponding to the dependent channel state information; and wherein an optimal value of the optimal values comprises at least one of: a modulation order under a condition of a preset error rate, a coding code rate under the condition of the preset error rate, or a transport block size under the condition of the preset error rate.

2. The method of claim 1, wherein the CSI feedback comprises at least one CSI report, and a CSI feedback number parameter of the CSI feedback is configured through radio resource control layer (RRC) signaling;

wherein the CSI feedback number parameter of the CSI feedback is configured for a specific CSI report, or the CSI feedback number parameter is configured for all CSI reports.

3. The method of claim 1, wherein the channel state information parameter set comprises at least one piece of channel state information, and the at least one piece of channel state information is configured based on at least one of a system pre-definition or RRC signaling.

4. The method of claim 1, wherein association DCI of the CSI feedback comprises at least one of DCI triggering the CSI feedback or DCI scheduling a data transmission.

5. The method of claim 1, wherein the determining the CSI feedback corresponding to the channel state information parameter set according to the reception of the scrambling configuration of the association downlink control information (DCI) comprises:

in a case where a radio network temporary identifier (RNTI) scrambled with the association DCI is a first-type RNTI, feeding back a set of values for the channel state information parameter set; and in a case where the radio network temporary identifier (RNTI) scrambled with the association DCI is a second-type RNTI, feeding back a value of a preset group number for the channel state information parameter set, wherein the preset group number is a positive integer greater than 1, and the preset group number is predefined by a system or configured through the CSI feedback number parameter;

wherein the first-type RNTI at least comprises one of a cell-radio network temporary identifier (C-RNTI), a configured scheduling-radio network temporary identifier (CS-RNTI), or a modulation and coding scheme-cell-radio network temporary identifier (MCS-C-RNTI), and the second-type RNTI comprises a non-terminal-specific RNTI.

6. The method of claim 1, wherein the determining the CSI feedback corresponding to the channel state information parameter set according to the scheduling data type identifier in the association DCI comprises:

in a case where the scheduling data type identifier indicates that scheduling data is a unicast data transmission, feeding back a set of values for the channel state information parameter set; and in a case where the scheduling data type identifier indicates that scheduling data is a non-unicast data transmission, feeding back a value of a preset group number for the channel state information parameter set, wherein the preset group number is a positive integer greater than 1, and the preset group number is predefined by a system or configured through the CSI feedback number parameter;

wherein the scheduling data type identifier at least comprises one of: a carrier indication, a bandwidth part (BWP) indication, a time domain resource allocation indication, a frequency domain resource allocation indication, a demodulation reference signal (DMRS) sequence related information indication, a scrambling code information indication for a data transmission channel, a data type indication, an antenna port indication, or a priority indication.

7. The method of claim 1, wherein the determining the CSI feedback corresponding to the channel state information parameter set according to the reception of the format of the association DCI comprises:

in a case where the format of the association DCI is a first-type format, feeding back a set of values for the channel state information parameter set; and in a case where the format of the association DCI is a second-type format, feeding back a value of a preset group number for the channel state information parameter set, wherein the preset group number is a positive integer greater than 1, and the preset group number is predefined by a system or configured through the CSI feedback number parameter;

wherein the first-type format and the second-type format comprise different number of bits.

8. The method of claim 1, wherein the determining the CSI feedback corresponding to the channel state information parameter set according to the reception of the time-frequency domain resource of the association DCI comprises:

in a case where the association DCI is detected on a first time-frequency domain resource, feeding back a set of values for the channel state information parameter set; and in a case where the association DCI is detected on a second time-frequency domain resource, feeding back a value of a preset group number for the channel state information parameter set, wherein the preset group number is a positive integer greater than 1, and the preset group number is predefined by a system or configured through the CSI feedback number parameter;

wherein the first time-frequency domain resource and the second time-frequency domain resource are set based on different pieces of configuration information;

wherein the configuration information at least comprises one of: a control resource set (CORESET), a search space, an aggregation level, a blind detection opportunity, or a resource element group (REG).

9. The method of claim 1, wherein the preset content in the reception of the at least two CSI feedback configurations having the same preset content comprises at least one of: a CSI feedback format, a channel state information-reference signal (CSI-RS) resource associated with the CSI feedback, a measurement carrier of the CSI feedback, a measurement BWP of the CSI feedback, or usage of the CSI feedback.

10. The method of claim 1, further comprising: in a case of the reception of the at least two CSI feedback configurations having the same preset content, feeding back a value of a preset group number for the channel state information parameter set, wherein the preset group number is a positive integer greater than 1, and the preset group number is predefined by a system or configured through the CSI feedback number parameter;

wherein values of the preset group number an order of good to poor correspond to the CSI feedback configurations having the same content and the different indices in an index order of small to large or in an index order of large to small.

11. The method of claim 1, wherein measuring the channel state information (CSI) comprises:

determining beam information of a channel state information measurement resource according to beam determination information.

12. The method of claim 11, wherein the beam determination information comprises at least one of:

beam information of a downlink data transmission channel;

beam information of DCI scheduling a downlink data transmission channel; or reception of a blind detection opportunity for DCI scheduling a downlink data transmission channel.

13. The method of claim 12, wherein the beam information of the downlink data transmission channel is determined by at least one of:

indicated in the DCI scheduling the downlink data transmission channel;

indicated in a medium access control (MAC) layer-control element (CE);

predefined by a system; or indicated by RRC signaling.

14. The method of claim 12, wherein an association of the downlink data transmission channel with the channel state information measurement resource exists, and the association comprises at least one of:

the downlink data transmission channel and the channel state information measurement resource being sent on a same carrier;

the downlink data transmission channel and the channel state information measurement resource being sent on a same BWP;

the downlink data transmission channel and the channel state information measurement resource being sent on a same frequency domain resource;

the downlink data transmission channel and the channel state information measurement resource being of a same type, wherein the type is a non-unicast type and is indicated by RRC configuration signaling or the DCI scheduling the downlink data transmission channel;

the DCI scheduling the downlink data transmission channel and the channel state information measurement resource being sent on same carrier;

the DCI scheduling the downlink data transmission channel and the channel state information measurement resource being sent on a same BWP; or the DCI scheduling the downlink data transmission channel and the channel state information measurement resource being sent on a same frequency domain resource.

15. The method of claim 11, wherein the channel state information measurement resource comprises at least one of: a periodic channel state information-reference signal (CSI-RS) resource, an aperiodic CSI-RS resource, or a semi-persistent CSI-RS resource.

16. A non-transitory computer-readable storage medium, storing a computer program, wherein the computer program, when executed by a processor, implements a channel state information feedback method, wherein the channel state information feedback method comprises:

measuring channel state information (CSI);

determining CSI feedback corresponding to a channel state information parameter set according to a set condition; and sending the CSI feedback corresponding to the channel state information parameter set;

wherein the set condition at least comprises one of:

a configuration of a CSI feedback number parameter;

a parameter value of a CSI feedback number parameter;

reception of a scrambling configuration of an association downlink control information (DCI);

a scheduling data type identifier in association DCI;

reception of a format of association DCI;

reception of a time-frequency domain resource of association DCI;

reception of at least two CSI feedback configurations having a same content and different indices; or reception of at least two CSI feedback configurations having a same preset content, wherein the preset content comprises at least one content of the at least two CSI feedback configurations;

wherein in a case where the CSI feedback number parameter of the CSI feedback indicates that the channel state information parameter set feeds back a set of values, feeding back a set of optimal values for the channel state information parameter set;

wherein the channel state information feedback method further comprises: in a case where the CSI feedback number parameter of the CSI feedback indicates that the channel state information parameter set feeds back at least two sets of values, feeding back optimal value of a preset group number for the channel state information parameter set, wherein the preset group number is a positive integer greater than 1, and the preset group number is predefined by a system or configured through the CSI feedback number parameter;

wherein in a case where the channel state information parameter set at least comprises two pieces of channel state information and a dependency between values of multiple pieces of channel state information exists, a value of dependent channel state information is determined based on at least two values of depended channel state information corresponding to the dependent channel state information; and wherein an optimal value of the optimal values comprises at least one of: a modulation order under a condition of a preset error rate, a coding code rate under the condition of the preset error rate, or a transport block size under the condition of the preset error rate.

* * * * *